(12) United States Patent
Shah et al.

(10) Patent No.: US 8,291,148 B1
(45) Date of Patent: Oct. 16, 2012

(54) RESOURCE VIRTUALIZATION SWITCH

(75) Inventors: Shreyas Shah, San Jose, CA (US); Subramaniam Vinod, San Jose, CA (US); Ramalingam K. Anand, Los Altos Hills, CA (US); Ashok Krishnamurthi, Saratoga, CA (US)

(73) Assignee: Xsigo Systems, Inc., San Jose, CA (US)

( * ) Notice: Subject to any disclaimer, the term of this patent is extended or adjusted under 35 U.S.C. 154(b) by 0 days.

(21) Appl. No.: 13/445,570

(22) Filed: Apr. 12, 2012

Related U.S. Application Data

(63) Continuation of application No. 13/229,587, filed on Sep. 9, 2011, now Pat. No. 8,180,949, which is a continuation of application No. 12/250,842, filed on Oct. 14, 2008, now Pat. No. 8,041,875, which is a continuation of application No. 11/179,085, filed on Jul. 11, 2005, now Pat. No. 7,502,884.

(60) Provisional application No. 60/590,450, filed on Jul. 22, 2004.

(51) Int. Cl.
*G06F 13/00* (2006.01)

(52) U.S. Cl. .................................. 710/316; 370/395.21

(58) Field of Classification Search .......... 710/316–317; 370/395.21, 396
See application file for complete search history.

(56) References Cited

U.S. PATENT DOCUMENTS

| | | |
|---|---|---|
| 7,103,888 B1 | 9/2006 | Cayton et al. |
| 7,171,434 B2 | 1/2007 | Ibrahim et al. |
| 7,171,495 B2 | 1/2007 | Matters et al. |
| 7,209,439 B2 | 4/2007 | Rawlins et al. |
| 7,281,030 B1 | 10/2007 | Davis |
| 7,412,536 B2 | 8/2008 | Oliver et al. |
| 7,502,884 B1 | 3/2009 | Shah et al. |
| 8,041,875 B1 | 10/2011 | Shah |
| 2002/0152327 A1 | 10/2002 | Kagan et al. |
| 2003/0051076 A1 | 3/2003 | Webber |
| 2003/0099254 A1 | 5/2003 | Richter |
| 2003/0200315 A1 | 10/2003 | Goldenberg et al. |
| 2004/0003154 A1 | 1/2004 | Harris et al. |
| 2004/0034718 A1 | 2/2004 | Goldenberg et al. |
| 2005/0141425 A1 | 6/2005 | Foulds |
| 2005/0160251 A1 | 7/2005 | Zur et al. |
| 2005/0198410 A1 | 9/2005 | Kagan et al. |
| 2005/0240621 A1 | 10/2005 | Robertson et al. |
| 2005/0262269 A1 | 11/2005 | Pike |
| 2006/0013240 A1 | 1/2006 | Ma et al. |
| 2006/0045098 A1 | 3/2006 | Krause |
| 2006/0129699 A1 | 6/2006 | Kagan et al. |
| 2006/0136570 A1 | 6/2006 | Pandya |
| 2006/0168286 A1 | 7/2006 | Makhervaks et al. |
| 2006/0168306 A1 | 7/2006 | Makhervaks et al. |
| 2006/0179178 A1 | 8/2006 | King |
| 2006/0182034 A1 | 8/2006 | Klinker et al. |

(Continued)

OTHER PUBLICATIONS

"U.S. Appl. No. 12/250,842 Non Final Office Action mailed Aug. 10, 2010", 9 pgs.

(Continued)

*Primary Examiner* — Clifford Knoll
(74) *Attorney, Agent, or Firm* — Kwan & Olynick LLP

(57) ABSTRACT

Methods and apparatus are provided for virtualizing resources including peripheral components and peripheral interfaces. Peripheral component such as hardware accelerators and peripheral interfaces such as port adapters are offloaded from individual servers onto a resource virtualization switch. Multiple servers are connected to the resource virtualization switch over an I/O bus fabric such as PCI Express or PCI-AS. The resource virtualization switch allows efficient access, sharing, management, and allocation of resources.

20 Claims, 16 Drawing Sheets

U.S. PATENT DOCUMENTS

2006/0193327 A1 8/2006 Arndt et al.
2006/0224843 A1 10/2006 Rao
2006/0242332 A1 10/2006 Johnsen et al.
2006/0253619 A1 11/2006 Torudbakken et al.
2006/0292292 A1 12/2006 Brightman et al.
2007/0101173 A1 5/2007 Fung
2008/0270726 A1 10/2008 Elnozahy et al.

OTHER PUBLICATIONS

"U.S. Appl. No. 12/250,842 Response filed Nov. 19, 2010 to Non Final Office Action mailed Aug. 10, 2010", 8 pgs.
"U.S. Appl. No. 12/250,842 Notice of Allowance mailed Feb. 18, 2011", 5 pgs.
"U.S. Appl. No. 12/250,842 Notice of Allowance mailed Jun. 10, 2011", 5 pgs.
"U.S. Appl. No. 11/179,085, Response filed Aug. 10, 2007 to Non Final Office Action mailed May 31, 2007", 8 pgs.
"U.S. Appl. No. 11/179,085, Final Office Action mailed Oct. 30, 2007", 13 pgs.
Figueiredo, et al., "Resource Virtualization Renaissance", *IEEE Computer Society*, 28-31.
Bhatt, Ajay V., "Creating a Third Generation I/O Interconnect", *Intel Developer Network for PCI Express*Architecture*, [Online]. Retrieved from the Internet: <www.express-lane.org>,Accessed Aug. 19, 2005,11 pgs.
"U.S. Appl. No. 11/179,085, Notice of Allowance mailed Aug. 11, 2008", 5 pgs.
"U.S. Appl. No. 11/179,085, Non Final Office Action mailed May 31, 2007", 14 pgs.
"U.S. Appl. No. 11/179,085, Pro Appeal Brief Request filed Jan. 24, 2008", 6 pgs.
"U.S. Appl. No. 11/179,085, Preliminary Amendment filed May 27, 2008", 9 pgs.
Cohen, Ariel et al., "Efficient Data Transfer Between Servers and Remote Peripherals", U.S. Appl. No. 11/200,761, filed Aug. 9, 2005, 32 pgs.
"U.S. Appl. No. 11/200,761, Non Final Office Action mailed Mar. 12, 2009", 22 pgs.
"U.S. Appl. No. 11/200,761, Final Office Action mailed Aug. 13, 2009", 22 pgs.
"U.S. Appl. No. 11/200,761, Non Final Office Action mailed Jan. 20, 2010", 22 pgs.
"U.S. Appl. No. 11/200,761, Final Office Action mailed Jul. 9, 2010", 22 pgs.
Liu, Jiuxing et al., "High Performance RDMA-Based MPI Implementation over InfiniBand", *ICS'03*, Jun. 23-26, 2003, San Francisco,*Copyright 2003, ACM*,10 pgs.
"U.S. Appl. No. 13/229,587, Non Final Office Action mailed Oct. 6, 2011" 4 pgs.
"U.S. Appl. No. 13/229,587, Response flied Jan. 4, 2012 to Non Final Office Action mailed Oct. 6, 2011", 4 pgs.
"U.S. Appl. No. 13/229,587, Notice of Allowance mailed Jan. 19, 2012", 5 pgs.

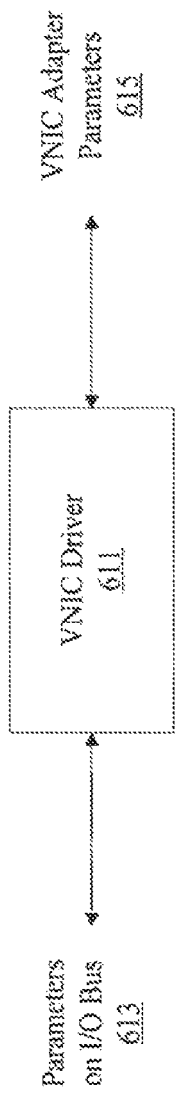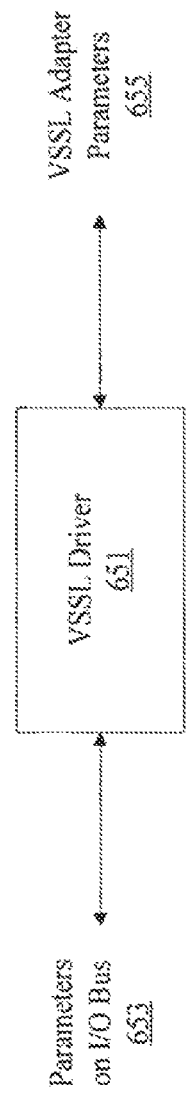

RESOURCE VIRTUALIZATION SWITCH

CROSS-REFERENCE TO RELATED APPLICATIONS

This continuation application claims priority from U.S. patent application Ser. No. 13/229,587, titled RESOURCE VIRTUALIZATION SWITCH, filed Sep. 9, 2011, which claims priority from U.S. patent application Ser. No. 12/250,842, now U.S. Pat. No. 8,041,875, titled RESOURCE VIRTUALIZATION SWITCH, filed Oct. 11, 2008, which claims priority from U.S. patent application Ser. No. 11/179,085, now U.S. Pat. No. 7,502,884, titled RESOURCE VIRTUALIZATION SWITCH, filed on Jul. 11, 2005, which claims the benefit of priority from U.S. Provisional Patent Application No. 60/590,450, titled METHODS AND APPARATUS FOR RESOURCE VIRTUALIZATION, filed on Jul. 22, 2004, all of which are incorporated herein in their entireties for all purposes.

BACKGROUND OF THE INVENTION

1. Field of the Invention

The present invention relates to resource virtualization. In one example, the present invention relates to methods and apparatus for efficiently providing resources such as peripheral interfaces and peripheral components in a virtualized, shared, and redundant manner to multiple servers connected over an I/O bus interface.

2. Description of Related Art

A server or computing system generally includes one or more processors, memory, and peripheral components and peripheral interfaces. Examples of peripheral components include cryptographic accelerators, graphics accelerators, and eXtensible Markup Language (XML) accelerators. Examples of peripheral interfaces include network interface cards (NIC), serial ATA (SATA) adapters, and host bus adapters (HBA). To increase processing power, servers are often aggregated as blades in a rack or as servers on a server farm or data center and interconnected using various network backbones or backplanes. In some examples, each server includes a network interface card configured for communication over an Ethernet network. The Ethernet network can include other devices that allow routing and switching to external entities and networks. To provide fault-tolerance, individual servers are often configured with redundant resources.

For example, a server may include multiple disks arranged as a redundant array of independent disks (RAID) to allow for continued operation in the event of the disk failure. Each server may also have multiple CPUs or multiple network cards to provide for fault tolerance. However, providing redundant resources in each server in a server rack or server farm can be expensive. A server farm including 40 individual systems and 40 disks would require typically in additional 40 disks for redundancy on each particular system. Redundancy can typically only be provided in a rigid and inflexible manner. A large number of links and redundant Ethernet links are needed to connect servers to networks.

Because resources such as peripheral components and peripheral interfaces are assigned on a per server or a per processor basis, other servers do not typically have access to these resources. In order to provide adequate resources for each server, resources are typically over-provisioned. That is, more hardware acceleration is provided than is typically needed. More network interface bandwidth is allocated than is typically used simply to handle worst-case or expected worst-case scenarios. Resources are over-provisioned resulting in overall waste and low utilization. Resource assignment on a per server or a per processor basis also limits the ability to reconstruct or reconfigure a resource environment. For example, XML accelerators may have to be included on each server even though each accelerator may be underutilized.

Having a number of disparate servers also increases the complexity associated with individual system management. The servers would typically have to be individually administered without the benefit of centralized administration. Oftentimes, servers would be equipped with narrowing graphics cards and I/O subsystems to allow for system administrator access.

Conventional system architectures create resource usage inefficiency, server management inefficiency, security loop holes, reconfiguration inflexibility, along with a number of other drawbacks. Consequently, it is desirable to provide techniques and mechanisms for providing virtualized resources including peripheral interfaces and peripheral components to servers in an efficient and effective manner to allow implementation of features conventionally not provided.

SUMMARY OF THE INVENTION

Methods and apparatus are provided for virtualizing resources including peripheral components and peripheral interfaces. Peripheral component such as hardware accelerators and peripheral interfaces such as port adapters are off-loaded from individual servers onto a resource virtualization switch. Multiple servers are connected to the resource virtualization switch over an I/O bus fabric such as PCI Express or PCI-AS. The resource virtualization switch allows efficient access, sharing, management, and allocation of resources.

In one embodiment, a resource virtualization switch is provided. The resource virtualization switch includes multiple resources and virtualization logic. The virtualization logic is configured to obtain data from multiple servers each including at least a processor and memory. The servers are connected to the resource virtualization switch over an I/O bus fabric. The virtualization logic is configured to provide the data to a selected resource.

In another embodiment, a technique for mapping resources is provided. Multiple servers are connected to a resource virtualization switch using an I/O bus. Multiple resources are included. The multiple resources are mapped into an aggregated address space managed by the resource virtualization switch. The aggregated address space includes address spaces associated with the multiple servers.

In yet another embodiment, a system for implementing a resource virtualization is provided. The system includes a bus interface, peripherals, and a processor. The bus interface is coupled to a plurality of servers. The bus interface provides serialized switched access to the multiple servers. The peripherals include network interfaces connected to external network devices. A processor is configured to receive requests for access to ones of the multiple peripherals from the servers. The processor identifies ones of multiple peripherals for handling the requests.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIGS. 6A-6B are diagrammatic representations depicting a VNIC and a VSSL driver.

DETAILED DESCRIPTION OF SPECIFIC EMBODIMENTS

Figure 1:
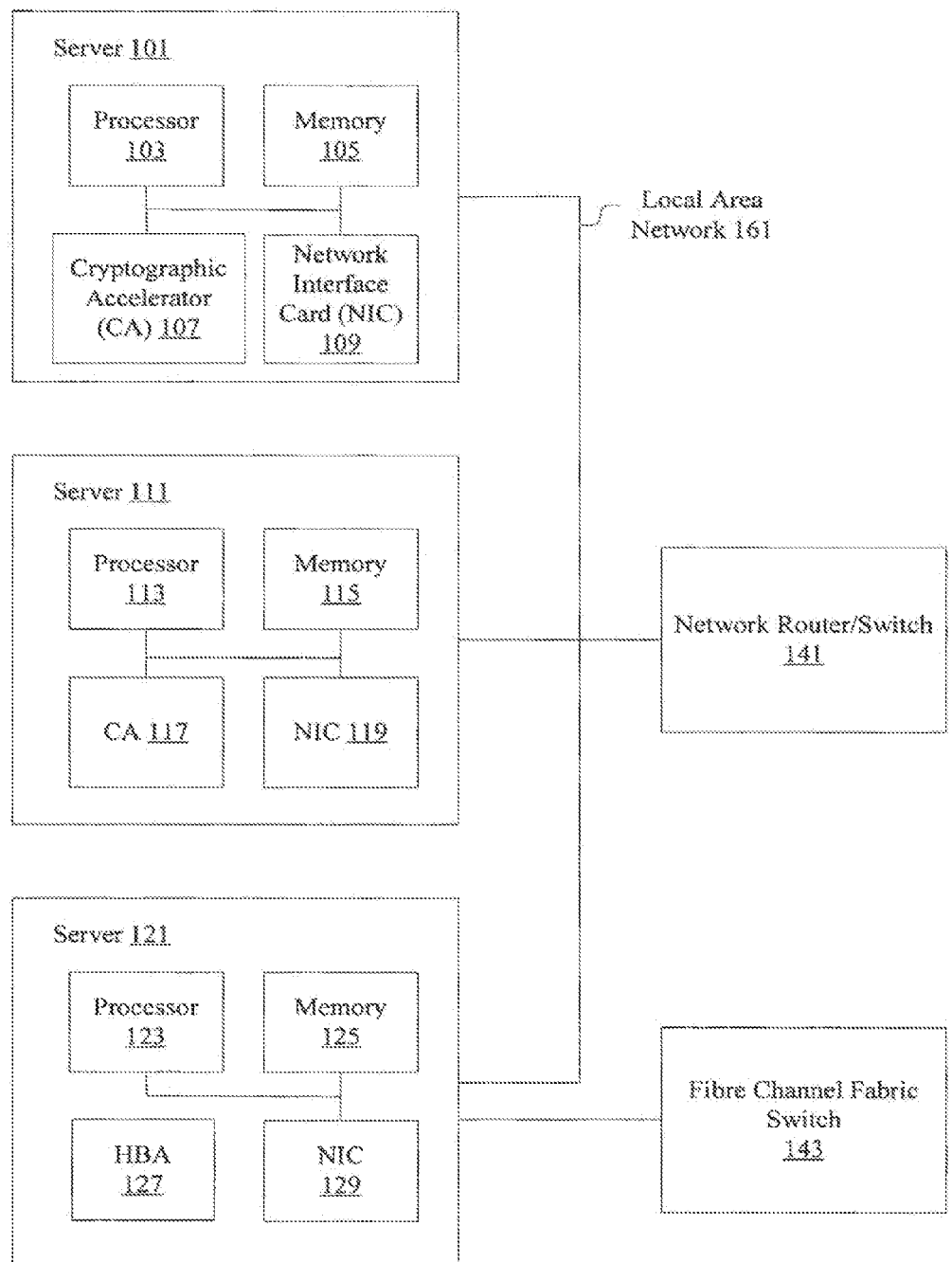
FIG. 1 is a diagrammatic representation showing individual servers.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Peripheral Control Interface (PCI) Express, I/O buses, and Ethernet/Internet Protocol (IP) networks. However, it should be noted that the techniques of the present invention can be applied to a variety of different standards and variations to PCI Express, PCI-AS, buses, and IP networks. Similarly, a server is described throughout. However, a server can be a single processing system, a multiple processor system, a guest operating system, a system image, a virtual machine, or a virtual machine. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

According to various embodiments, servers having processors and memory no longer have access to a physical peripheral component or a physical peripheral interface, but instead have access to logical or virtual resources. One technique for virtualizing resources involves using a Basic Input Output System (BIOS) to determine available resources. A BIOS can be configured to perform device discovery and bind virtual resources to servers including computer systems, guest operating systems, system images, etc. However, performing device discovery in a BIOS limits functionality to a single root complex or one or two processors. Furthermore, using a BIOS requires modification of numerous system components from a variety of vendors. For example, processor and chip set vendors would have to modify their product offerings in order to allow compatibility with BIOS device discovery.

Consequently, various embodiments of the present invention provide device discovery and virtual resource binding at the device driver level. In some embodiments, resources such as hardware accelerators, NICs, and HBAs are removed from individual servers and aggregated at the resource virtualization entity such as a resource virtualization switch. In one example, resource virtualization switch creates an on-demand provisioned and traffic engineered data center by seamlessly integrating existing hardware and software infrastructure. The resource virtualization switch receives requests from individual servers over a bus interface such as PCI Express and determines what resources to provide to handle individual requests. For example, a first server may request transmit data over a local area network. The request is routed to the resource virtualization switch that then determines how to handle the request. In one example, the request is forwarded to the NIC corresponding to the first server.

Access to resources such as TCP Offload Engines (TOE), Internet SCSI (iSCSI), and Remote DMA (RDMA) remains at the I/O bus or fabric level. Any mechanism allowing interconnection of components in a computer system is referred to herein as a I/O bus, fabric, or interface. Examples of buses include PCI, PCI Express, PCI Advanced Switch (PCI-AS), Vesa Local Bus (VLB), PCMCIA, and AGP. For example, master components (e.g. processors) initiate transactions such as read and write transactions over buses with slave components (e.g. memory) that respond to the read and write requests. Buses are typically associated with a memory space to allow for use of read and write transactions. Any device or system having one or more processors that are able to access a shared memory address space is referred to herein as a server, computer, or computing system. In one example, a server includes multiple processors that can all access a shared virtual or physical memory space. Examples of servers can include system images, guest operating systems, and virtual machine layers. Although each processor may own separate cache lines, each processor has access to memory lines in the memory address space.

According to various embodiments, hardware accelerators are included in a resource virtualization switch connected to multiple servers using a bus interface such as PCI Express or PCI-AS (PCI Advanced Switch). The bus interface provides a low latency, high bandwidth connection between the multiple servers and the cryptographic accelerators in the resource virtualization switch. The resource virtualization switch can be configured to aggregate several server memories into a unified memory or an aggregated memory address view to allow sharing of a resources among multiple servers. In some examples, available resources are mapped into an aggregated address space. For example, instead of writing to an address space associated with a local component, the data is written into the global address space associated with the resource virtualization switch. Resources can be assigned and reassigned by modifying address translation. The resource virtualization switch allows dynamic reconfiguration and remapping of virtual resources to servers to support true stateless computing and utility computing and allows charge back by application, user, departments, etc. Storage resources including local disks can be shared and virtualized to allow stateless computing.

Requests from multiple servers may also be forwarded to the same NIC. An administrator can provision and partition resources including server resources, peripheral component resources, and peripheral interface resources at the resource virtualization switch based on particular needs and requirements. According to various embodiments, a resource virtualization switch can also perform packet inspection or deep packet inspection to classify server traffic. Traffic policies can be applied to allow application level quality of service. Quality of service (QoS) and traffic engineering schemes can be implemented at the bus level. In a conventional architecture, quality of service (QoS) and traffic engineering were available only at the network level and not at the bus level. Traffic associated with particular devices or servers can be given priority or guaranteed bandwidth. The total amount of resources can be decreased while increasing resource utilization. For example, the number of encryption accelerators can be substantially reduced while maintaining secure transmissions both on the bus and over an external network. The resource virtualization switch can be introduced into existing server racks and farms with little disruption to system operation.

FIG. 1 is a diagrammatic representation showing a typical system for connecting servers to an IP network. Server 101 includes a processor 103, memory 105, a cryptographic accelerator 107, and NIC 109. The processor 103 communicates with other components and interfaces in the system using an I/O bus and associated I/O controllers. One or more bus bridges may also be used. In typical implementations, communications between components and interfaces in server 101 occur over an I/O bus such as PCI. Server 111 includes processor 113, cryptographic accelerator 117, memory 115, and NIC 119. Communication within server 111 similarly occurs over one or more I/O buses. Server 121 includes a processor 123, memory 125, HBA 127 and NIC 129. In order to allow communication with an IP network through a local area network and through network router 141, NICs 109, 119, and 129 are provided. To allow communication with a fibre channel storage area network through fibre channel switch 143, an HBA 127 is provided. In one example, a processor 103 passes data to a cryptographic accelerator 117 to encrypt data prior to transmitting the data onto the local area network 161. Similarly, data received from a NIC 109 is passed to a cryptographic accelerator 117 for decryption when data is received by the processor 103.

The various NICs 107, 119, and 129 are also associated with IP addresses and media access control (MAC) addresses. Each server and associated NIC encapsulates data into IP packets for transmission to a network router 141. Encapsulation may involve adding appropriate Telnet Control Protocol (TCP) and IP headers and addresses. Each NIC is also configured to remove TCP/IP headers and addresses and provide data to an associated processor over a system bus when IP packets are received from an IP network. An HBA 127 may be configured to perform fabric login (FLOGI) and port login (PLOGI) processes associated with operating in a fibre channel storage area network. Each server 101, 111, and 121 may be a UNIX based low-end to high-end servers, mainframes, individual computers, or blade servers. Any system including a processor and memory and an address space is referred to herein as a server. A server may include components noted above as well as a variety of other components.

In some example, a series of servers each include a processor and a number of resources such as HBAs, NICs, iSCSI TOE, sATA as well as other peripherals interfaces and peripheral components. Cables and lines are then connected to each server to allow access to Ethernet switches, Fibre Channel switches, appliances, and mainframe or KVM switches. In some examples, redundant cables are used to connect each server to each switch. In an example with 40 servers, 80 cables would be used to connect the servers to an Ethernet switch. An additional 80 cables would be used to connect the servers to Fibre Channel switch, etc. The resource allocation and system management inefficiencies are magnified by the physical complexities of routing the individual cables.

Figure 2A:
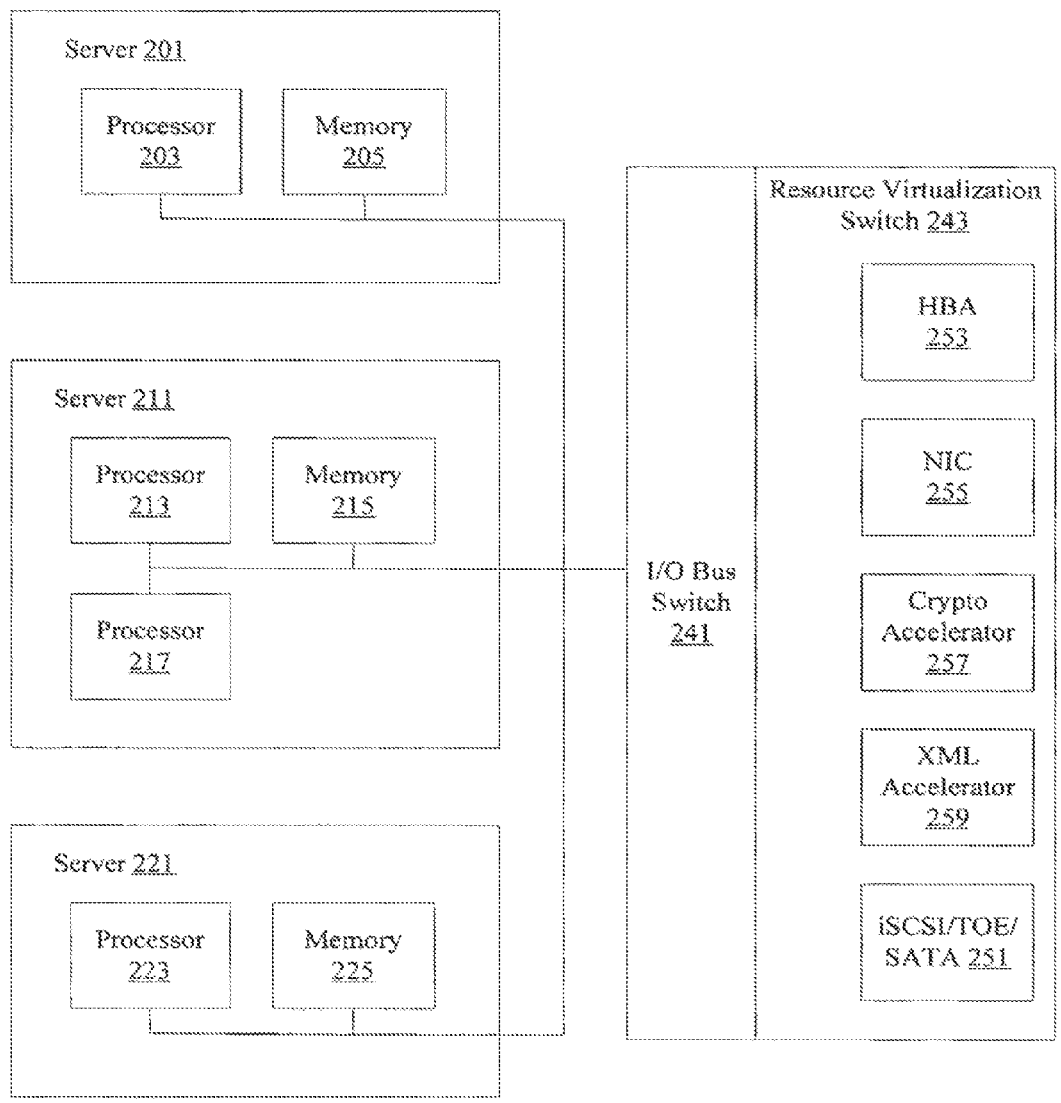
FIGS. 2A and 2B are diagrammatic representations showing individual servers connected to a resource virtualization switch.

FIG. 2A is a diagrammatic representation showing separate servers connected to a resource virtualization switch 243. Server 201 includes processor 203 and memory 205. Server 211 includes processors 213 and 217 and memory 215. Server 221 includes only processor 223 and memory 225. Components and peripherals in each server 201, 211, and 221 are connected using one or more I/O buses. It should be noted that a server can be a virtual server such as a guest operating system, an application, or a virtual machine. According to various embodiments, the I/O bus is extended to allow interconnection with other servers and external entities through an I/O bus interconnect such as an I/O bus switch 241. In one example, server 201 no longer uses addresses such as port world wide names (pwwns) associated with an HBA or media access control (MAC) addresses associated with a NIC to communicate with other servers and external networks, but each server is instead configured communicate with a resource virtualization switch 243 using an I/O bus switch 241.

An I/O bus switch 241 may be a standalone entity, integrated within a particular server, or provided with a resource virtualization switch 243. According to various embodiments, components such as HBA 253, NIC 255, a cryptographic accelerator 257, an XML accelerator 259, Internet SCSI (iSCSI)/TCP Offload Engine (TOE)/Serial ATA (SATA) 251, can be offloaded from servers 201, 211, and 221 onto a resource virtualization switch 243. The resources including HBA 253, NIC 255, cryptographic accelerator 257, XML accelerator 259, and iSCSI/TOE/SATA 251 are maintained in a shared and virtualized manner on a resource virtualization switch 243. Links are provided between the resource virtualization switch and external switches such as an IP network switch.

According to various embodiments, a series of servers is connected to the resource virtualization switch using a PCI Express bus architecture. In some cases, a PCI Express bridge is used to increase compatibility with some existing systems. However, a PCI Express bridge is not necessarily needed. By using a resource virtualization switch, the number of resources and links can be significantly reduced while increasing allocation efficiency. Resources can be accessed at the driver level. Virtual resources including service engines can be dynamically bound to servers including system images, guest operating systems, and virtual machines. In one instance, a cryptographic accelerator is bound to a particular system image.

In this example, to perform cryptographic operations associated with sending or receiving data, a server 201 passes data to the resource virtualization switch cryptographic accelerator 257 as though the resource virtualization switch cryptographic accelerator 257 were included in the server 201. To perform XML operations, a server 201 passes data to the XML accelerator 259 as though the XML accelerator 259 is included in the server 201. Alternatively, XML and cryptographic operations can be performed as data is received at a resource virtualization server from a network. Consequently, additional server 201 processor involvement is not needed.

PCI Express is a low-cost, scalable, switched, point-to-point, serial I/O interconnection scheme that maintains backward compatibility with PCI. The PCI Express architecture is specified using an Open System Interconnection (OSI) layer model and uses a load-store addressing architecture with a flat address space to allow interoperability with existing PCI applications. The software layers generate read and write requests that are transported by the transaction layer to the I/O devices using a packet-based, split-transaction protocol. The link layer adds sequence numbers and CRC to these packets to create a highly reliable data transfer mechanism.

The basic physical layer includes a dual simplex channel that is implemented as a transmit pair and a receive pair. Although PCI Express is expected to gain wider acceptance, adoption may be gradual as a large number of existing devices are configured for use with PCI and not PCI Express. Consequently, PCI Express bridges may be needed in certain instances. PCI Express used with the techniques of the present invention provides support for quality of service (QoS), power management, and I/O virtualization. Quality of service and power management improve data integrity and allow control of power consumption.

I/O virtualization allows data to be routed along logical routes, provides allocation of bandwidth to groups of devices, and allows prioritization of traffic patterns. Although the techniques of the present invention will be described in the context of PCI Express, it should be recognized that the techniques of the present invention are not limited to PCI Express and indeed are applicable to other standards and variations to standards such as PCI-AS, RapidIO, Serial RapidIO, InfiniBand, etc.

Figure 2B:
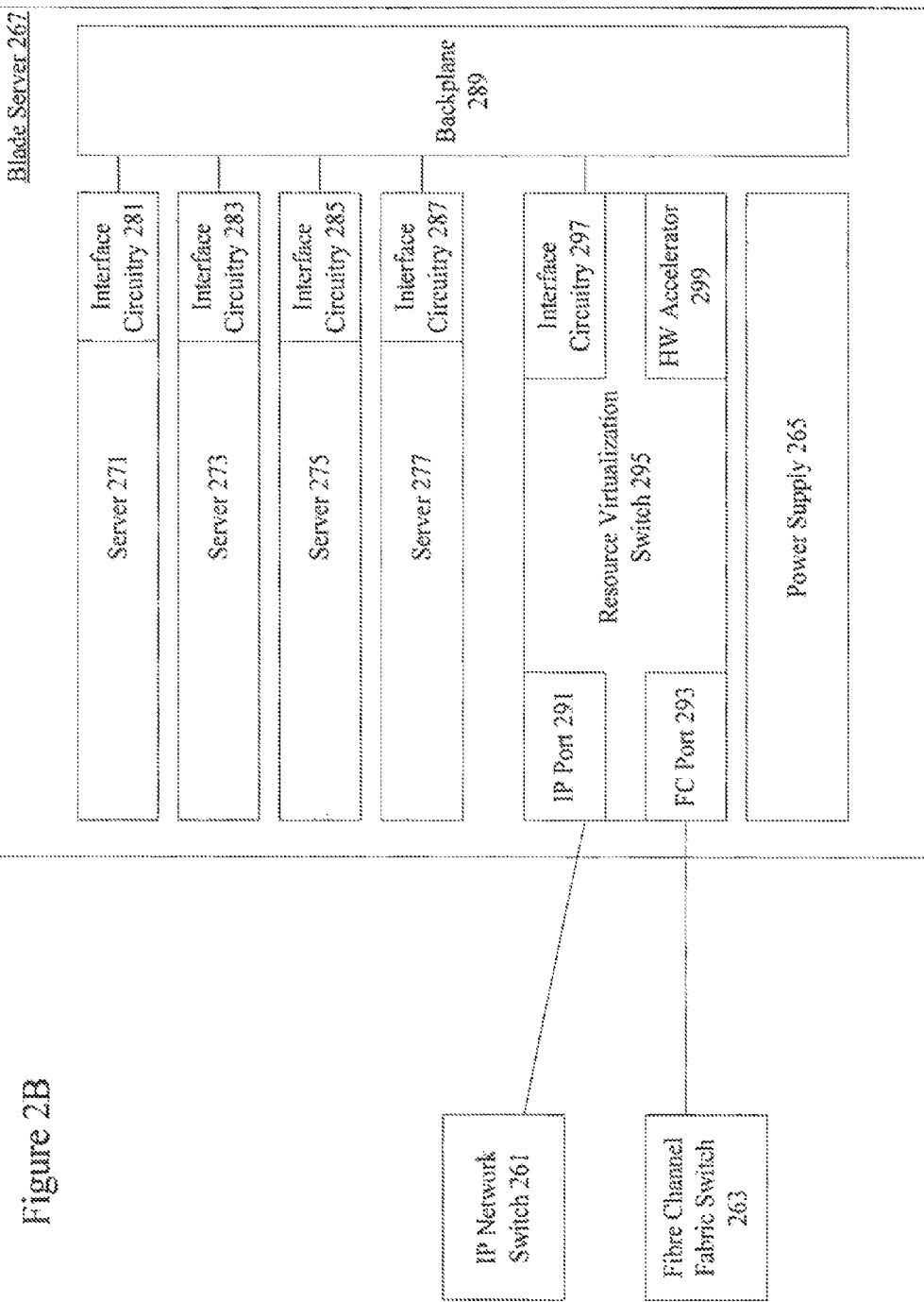

FIG. 2B is a diagrammatic representation showing another example of a servers connected to a resource virtualization switch. Although a particular blade server configuration is being described, it should be noted that a wide variety of system configurations are available. The blade server 267 includes multiple servers 271, 273, 275, and 277. Each server may include a processor and memory. Some servers may include peripheral components and peripheral interfaces as well. According to various embodiments, each server includes circuitry 281, 283, 285, and 287 to interface with a backplane 289. In some embodiments, circuitry 281, 283, 285, and 287 may be bus bridges used to interface with a PCI Express backplane 289. Additional connections between servers may also be provided. For example, an additional Ethernet network may be provided to allow connection between servers 271, 273, 275, and 277. Alternatively, servers 271, 273, 275, and 277 can be configured not only to access resources and switches 261 and 263 over a backplane but also to communicate with each other over the backplane.

Servers 271, 273, 275, and 277 can access resources such as IP port adapter 291, fibre channel port adapter 293, or hardware accelerator 299 on a resource virtualization switch 295. A power supply 265 is also included in the blade server 267. It should be noted that the blade server 267 can support any number of server cards and resource virtualization switches. For example, redundant resource virtualization switches 295 may be included to provide high availability. Each server may be embodied in a case, card, a blade, or even a single integrated circuit (IC) device or portion of an IC device. Techniques for performing interconnection can be implemented on one or more application specific integrated circuits (ASICs) and/or programmable logic devices (PLDs). The entire interconnection mechanism can be provided on a server, a card, a chip, or on a processor itself.

Figure 3:
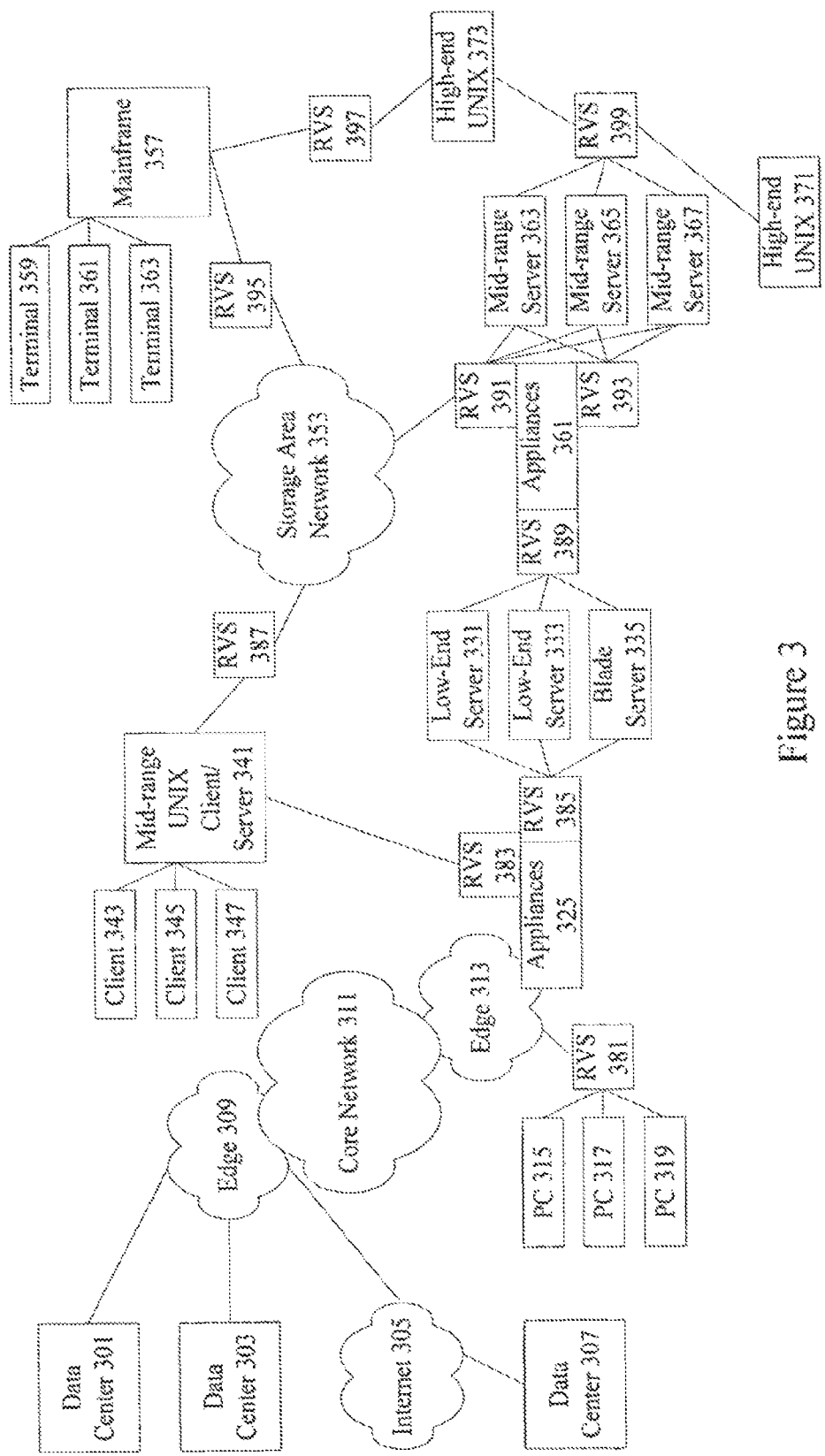
FIG. 3 is a diagrammatic representation showing a data center.

FIG. 3 is a diagrammatic representation showing some examples of where a resource virtualization switch can be implemented in a system such as a data center. In conventional systems, resources are included in individual servers as low-end servers 331, 333, and 335 and personal computers 315, 317, and 319. In conventional systems, resources may include peripheral interfaces and peripheral components. Resources may also be included as appliances 325 and 361 such as SSL, virtual private network (VPN), XML, SLB, and firewall devices. Appliances can be stand alone devices or can be included in a network switch or router. For example, a cryptographic accelerator can be offloaded onto an edge network appliance 325.

However, conventional techniques for offloading or sharing resources such as cryptographic accelerators are expensive, burdensome, and inadequate. Consequently, the techniques of the present invention contemplate providing resources on a resource virtualization switch that is connected to multiple servers over a fabric such as PCI Express. The servers can be configured to share a number of interface and component resources.

A resource virtualization switch 381 can be configured between personal computers 315, 317, 319, and an edge network 313. The edge network 313 is associated with core network 311. The core network 311 allows connection to other data centers 301 and 303 as well as to data center 307 through Internet 305 and edge 309. Another resource virtualization switch 383 may include resources typically provided in appliances 325 such as firewalls, SLB, SSL, VPN, and compression resources. The resource virtualization switch 383 provides virtualized resources to mid-range UNIX client/server 341 which is coupled to clients 343, 346, and 347. Mid-range UNIX client/server 341 is also connected to storage area network 353 using shared and virtualized resources provided by resource virtualization switch 387. Resource virtualization switch 385 and resource virtualization switch 389 provide shared and virtualized resources to low-end servers 331 and 333 as well as to blade server 335.

Redundant resource virtualization switch 391 and 393 are configured to provide fault tolerant resources to mid-range servers 363, 365, and 367 and provide functionality conventionally supplied by appliances 361 or components and interfaces included in servers. In some embodiments, appliances are no longer needed. Resource virtualization switch 399 connects mid-range servers 363, 365, and 367 to high-end UNIX servers 371 and 373. A mainframe 357 can also access shared and virtualized resources in resource virtualization switch 395 and resource virtualization switch 397. Mainframe 357 is associated with terminals 359, 361, and 363. Resource virtualization switches can be situated at a variety of system locations to provide virtualized resources to a number of entities. In some examples, resource virtualization switches are provided to interconnect a series of low-end servers, midrange servers, and high-end servers. Hardware acceleration resources and I/O resources can be aggregated at the resource virtualization switch. A resource virtualization switch can also allow message passing between individual servers using a bus architecture such as PCI express in a highly efficient manner minimizing latency.

Figure 4:
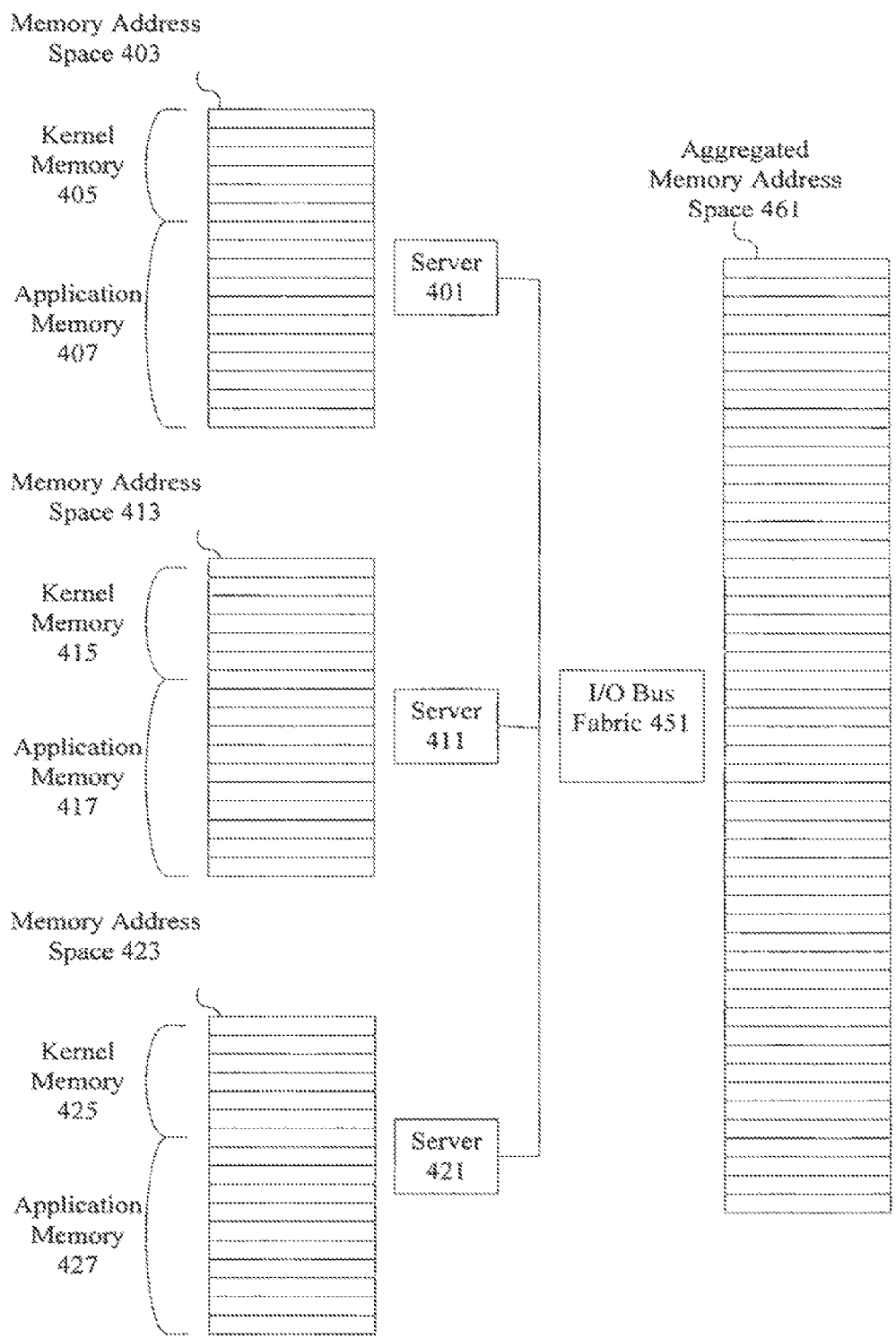
FIG. 4 is a diagrammatic representation depicting servers having separate memory address spaces.

FIG. 4 is a diagrammatic representation showing separate servers each associated with a memory address space. According to various embodiments, server 401 includes a memory address space 403 with kernel memory 405 and application memory 407. The memory address space 403 may be a physical memory address space or a virtual memory address space. Server 401 may include one or more processors with access to the memory address space. Server 411 includes a memory address space 413 with kernel memory 415 and application memory 417. The memory address space 413 may be a physical memory address space or a virtual memory address space. Server 411 may include one or more processors with access to the memory address space. Server 421 includes a memory address space 423 with kernel memory 425 and application memory 427. The memory address space 423 may be a physical memory address space or a virtual memory address space. Server 421 may include one or more processors with access to the memory address space.

According to various embodiments, the separate servers 401, 411, and 421 are connected to a resource virtualization switch using an I/O bus. The I/O bus interconnect 451 is associated with logic that allows aggregation of the memory address spaces 403, 413, and 423 into an aggregated memory address space 461. Any logical address space that includes the memory address spaces of multiple computer systems or servers is referred to herein as an aggregated memory address space. In one embodiment, an aggregated memory address space is managed by virtualization logic associated with an I/O bus switch or by a resource virtualization switch. According to various embodiments, virtual resources including peripheral components and peripheral interfaces are mapped into the aggregated address space. Virtual resources can be dynamically reconfigured by remapping the virtual resources into different address spaces associated with servers such as guest operating systems, applications, system images, and virtual machines.

When a transaction occurs in a memory address space 413, the resource virtualization switch identifies the transaction as a server 411 transaction. The memory address space regions can be used to classify traffic. For example, data received from a server 411 in memory address space 413 can be assigned a particular identifier for transmission onto an IP network. When a reply to the transmission is received from the IP network, the exchange identifier is used to determine which server the resource virtualization switch forwards the reply to. In one example, a table listing server identifiers, memory address spaces, and source and destination address pairs is maintained by a resource virtualization switch. When a server writes a data block to a resource virtualization switch, an optional server identifier is assigned to IP packets for transmitting that data block. Reply messages with the same server identifier can then be appropriately forwarded to the originating server. It will be recognized that a variety of parameters other than server identifiers can be used to classify traffic.

In other examples, resources at a resource virtualization switch are assigned a specific portion of the aggregated memory address space. Individual servers are also assigned portions of an aggregated memory address space in a manner that allows use of particular resources. Server identifiers would be optional, as the originating server could be identified based on the portion of the address space used. Resources can be assigned to particular servers by mapping the resource into the corresponding portion of the aggregated address space 461. For example, an XML accelerator included in a resource virtualization switch can be assigned to one or more servers by assigning into the appropriate aggregated address space portions.

Alternatively, individual servers may be assigned identifiers. In one example, the techniques of the present invention include a PCI Express Advanced Switching fabric. Individual processors or servers are provided with identifiers. Resources can be associated with individual identifiers instead of portions of an aggregated address space 461. A processor can control an I/O subsystem or communicate with other processors using the identifier. With protocol encapsulation, PCI-AS can tunnel any protocol, including Ethernet, ATM, SCSI, Serial ATA, PCI, PCI Express, StarFabric, etc. A routing header can be configured to include information needed to route the packet across the fabric. In addition, the routing header includes a protocol identification field. The identifier provides a receiver with the format of the payload included in the packet.

Figure 5:
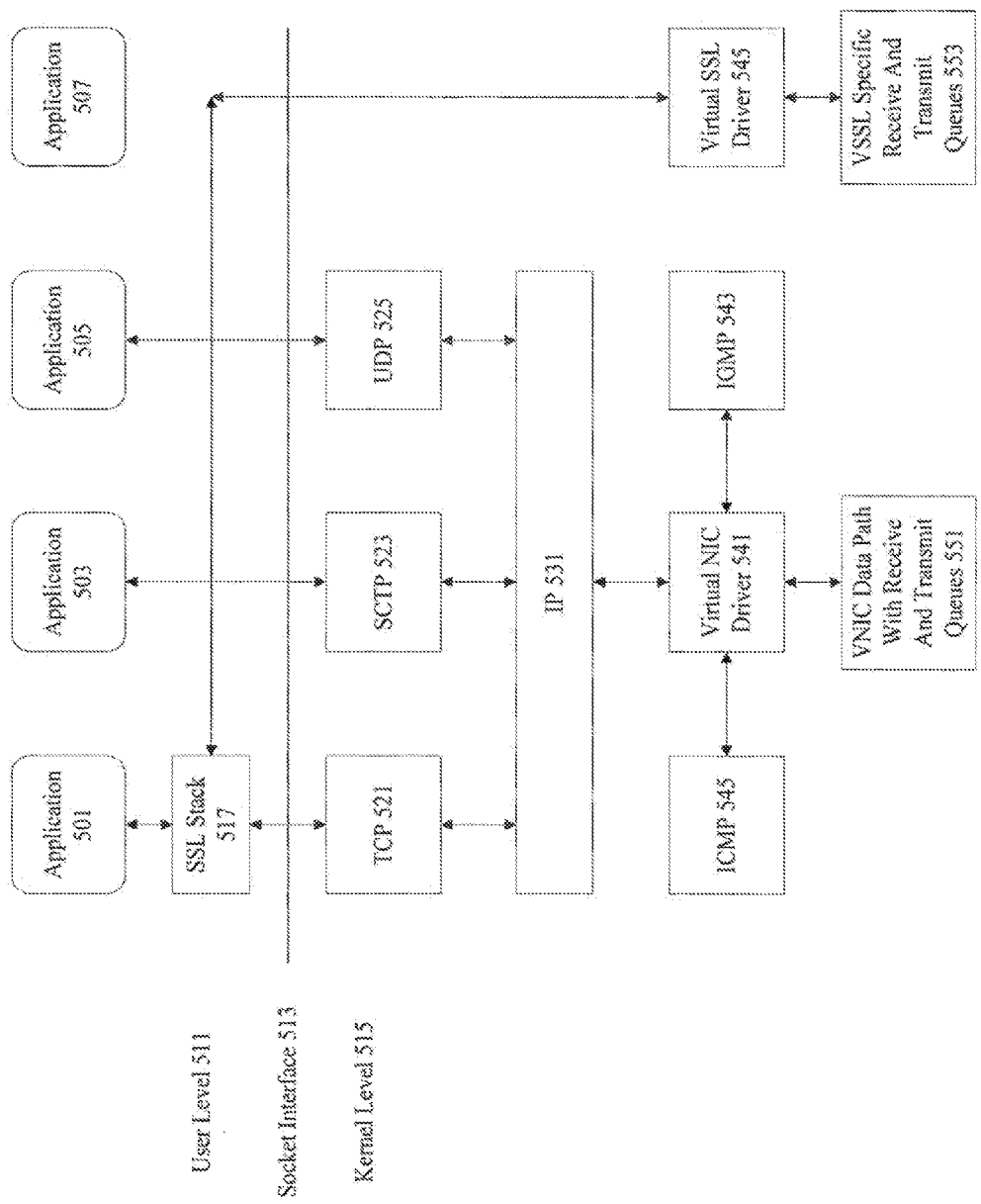
FIG. 5 is a diagrammatic representation showing a layer model using virtual NIC (VNIC) and a virtual SSL (VSSL) device driver.

FIG. 5 is a diagrammatic representation showing one example of a software architecture using the interconnection mechanisms of the present invention where a virtualized NIC is used for communication with external entities and a virtualized SSL accelerator is used for cryptographic processing. Although an SSL accelerator is being described, it will be recognized that a variety of hardware accelerators can be used. A user level 511 includes multiple applications 501, 503, 505, and 507. The user level 511 is coupled to a kernel level 515 through a socket interface 513. The socket interface 513 is associated with an SSL stack 517. Some examples of SSL stacks include OpenSSL and TurboSSL. According to various embodiments, the SSL stack 517 included no longer interfaces with an SSL driver but instead interfaces with an virtual SSL driver 545. In some embodiments, the SSL stack 517 works with both software cryptography and SSL accelerators simultaneously. The SSL stack 517 also includes functions that can be called by a processor server to determine if a virtualized SSL card is available to a particular application.

According to various embodiments, any application that uses an SSL service uses the SSL stack. In one embodiment, when an application that uses SSL initializes, the application determines if a virtualized SSL accelerator is available. If an accelerator is available and the server has access to that accelerator, SSL handshake and bulk encryption and decryption are off-loaded onto the accelerator. If no accelerator is accessible, then SSL processing is performed by the server processor without the benefit of dedicated hardware.

Also residing at the kernel level 515 are various transport layer protocols such as a transport control protocol (TCP) 521, user datagram protocol (UDP) 525, and Stream Control Transmission Protocol (SCTP) 523. In some examples, the transport layer protocols use the network layer Internet Protocol (IP) 531 associated with a device driver. However, the device driver is no longer a conventional device driver associated with a NIC or any other resource.

According to various embodiments, the NIC driver and the SSL driver are replaced with modified device drivers 541 and 545. The virtual NIC driver 541 may be associated with the Internet Control Message Protocol (ICMP) 545 and the Internet Group Management Protocol (IGMP) 543. Any device driver configured to drive a component on a resource virtualization switch is referred to herein as a modified or virtual device driver.

The modified or virtual device driver 541 or 545 is configured to allow kernel access to a virtual peripheral such as a virtual NIC or a virtual SSL accelerator. The kernel continues to operate as though it has access to a peripheral such as a NIC card or an SSL accelerator included in the server. That is, the kernel may continue to operate as though the NIC or SSL accelerator can be accessed directly over the bus without using a resource virtualization switch. Applications do not need to be modified to work with virtualized resources. The virtual device drivers supplied are actually driving operation of receive and transmit queues 551 and 553.

Applications may continue to use a conventional network technology such as TCP/IP and a virtual NIC driver can automatically modify data to allow transmission on an I/O bus such as PCI Express. Hardware accelerators such as SSL accelerators, eXtensible Markup Language (XML) accelerators, digital signal processors (DSPs), and graphics accelerators can be virtualized while allowing rapid and efficient access in a secure local bus environment. Mainframe access using keyboard video monitor (KVM) can be shared. Quality of service and traffic engineering can be applied at the bus level. Furthermore, resources can be flexibly provisioned and reconfigured. Multiple VNICs can be assigned to a single application to allow for path redundancy in the event that a single NIC fails.

FIG. 6A is a diagrammatic representation showing one example of a virtual NIC (VNIC) driver. Any mechanism allowing the mapping of multiple servers over an I/O bus to a single NIC device is referred to herein as a VNIC driver. When a conventional NIC card or device is connected to a computer system over a bus, a number of I/O bus parameters 613 are configured for that NIC. According to various embodiments, a VNIC driver 611 keeps the same set of I/O bus parameters 613 to allow a VNIC driver to operate in conventional systems. In one example, a processor in a server uses the same set of parameters and formats used for a NIC driver to operate a VNIC driver. According to various embodiments, both a NIC and a VNIC driver 611 use the same NIC parameters 613. Some configuration parameters that may be used include bus widths, physical addresses, descriptor ring sizes, and buffer thresholds.

In some embodiments, a NIC driver typically includes a send driver and a receive driver. A send driver initiates a transmission whenever the upper level software passes data to the driver. If the driver is unable to transmit the packet immediately, the supplied packet is queued in a transmit-pending buffer associated with a NIC. However, in an implementation using VNICs, the supplied packet is transmitted immediately over an I/O bus to a resource virtualization switch. In some instances, the resource virtualization switch queues the packet in a transmit-pending buffer or in a queue associated with the initiating server. After forwarding the packet, the send driver operates in conjunction with an interrupt service routing (ISR) and interrupts the processor to signal the end of transmission and indicate status to the processor.

A receive driver conventionally transfers data received from a network to the memory of the host. Typically, network data is received on a receive buffer ring associated with a NIC card and transferred to memory upon accessing an ISR. However, since a NIC is moved from a server onto a resource virtualization switch, the VNIC driver receives data directly from an I/O bus. The VNIC driver is interrupt driven and arbitrates for access to the I/O bus connecting the host to the resource virtualization switch. When access is available, the resource virtualization switch reads buffer rings or descriptor queues associated with a resource virtualization switch and transfers data into its own receive buffer ring. It can then proceed to interrupt the host processor to transfer data into host memory or directly transfer data into host memory and interrupt the host processor with status information when the transfer is complete.

FIG. 6B is a diagrammatic representation showing one example of a virtual SSL (VSSL) driver. Any mechanism allowing a server to access an SSL accelerator shared by multiple servers over an I/O bus is referred to herein as a VSSL driver. When a conventional SSL card or device is connected to a computer system over a bus, a number of I/O bus parameters 653 are configured for that SSL accelerator. According to various embodiments, a VSSL driver 651 keeps the same set of I/O bus parameters 653 to allow a VSSL driver to operate in conventional systems. In one example, a processor in a server uses the same set of parameters and formats used for an SSL driver to operate a VSSL driver. According to various embodiments, both a SSL and a VSSL driver 651 use the same SSL parameters 653. In typical embodiments, only one VSSL driver is included on each server. The VSSL driver 651 is capable of working with multiple physical SSL accelerators. For example, each VSSL driver 651 can operate with multiple sets of transmit and receive descriptor rings used to communicate with SSL accelerators.

Some adapter parameters 655 that the VSSL driver accesses include the location of the descriptor rings that it should use to access particular SSL accelerators. The driver 651 has SSL specific receive/transmit (Rx/Tx) descriptor queues or rings. Whenever an SSL record needs to be processed, it is placed by the VSSL driver 651 in the transmit queue. Responses from SSL card arrive in the receive queue. VSSL adapter parameters 655 include bus widths, physical addresses, descriptor ring sizes, and buffer thresholds.

The VSSL driver 651 accepts requests from SSL applications and the SSL stack. The VSSL driver 651 can also be configured to support redundant SSL accelerators. For example, a VSSL driver 651 may be provided with multiple sets of transmit and receive descriptor queues associated with different physical SSL accelerators. If a particular SSL accelerator fails, the VSSL driver 651 begins to use a backup SSL accelerator's transmit and receive descriptor queues.

The VSSL driver can also be configured to maintain statistics, such as the number of SSL connections per server and per application, the number of incoming and outgoing packets decrypted and encrypted per server and per application, total number of bytes decrypted and encrypted per server and per application, and number of errors per server and per application.

A VSSL driver can be configured as a send driver and a receive driver. A send driver initiates a transmission whenever the upper level software passes data to the driver. If the driver is unable to transmit the packet immediately, the supplied packet is queued in a transmit-pending buffer associated with a SSL. However, in an implementation using VSSLs, the supplied packet is transmitted immediately over an I/O bus to a resource virtualization switch. In some instances, the resource virtualization switch queues the packet in a transmit-pending buffer or in a queue associated with the initiating server. After forwarding the packet, the send driver operates in conjunction with an interrupt service routing (ISR) and interrupts the processor to signal the end of transmission and indicate status to the processor.

A receive driver conventionally transfers data received to the memory of the host. The VSSL driver receives data directly from an I/O bus. The VSSL driver is interrupt driven and arbitrates for access to the I/O bus connecting the host to the resource virtualization switch. When access is available, the resource virtualization switch reads buffer rings or descriptor queues associated with a resource virtualization switch and transfers data into its own receive buffer ring. It can then proceed to interrupt the host processor to transfer data into host memory or directly transfer data into host memory and interrupt the host processor with status information when the transfer is complete.

Figure 7:
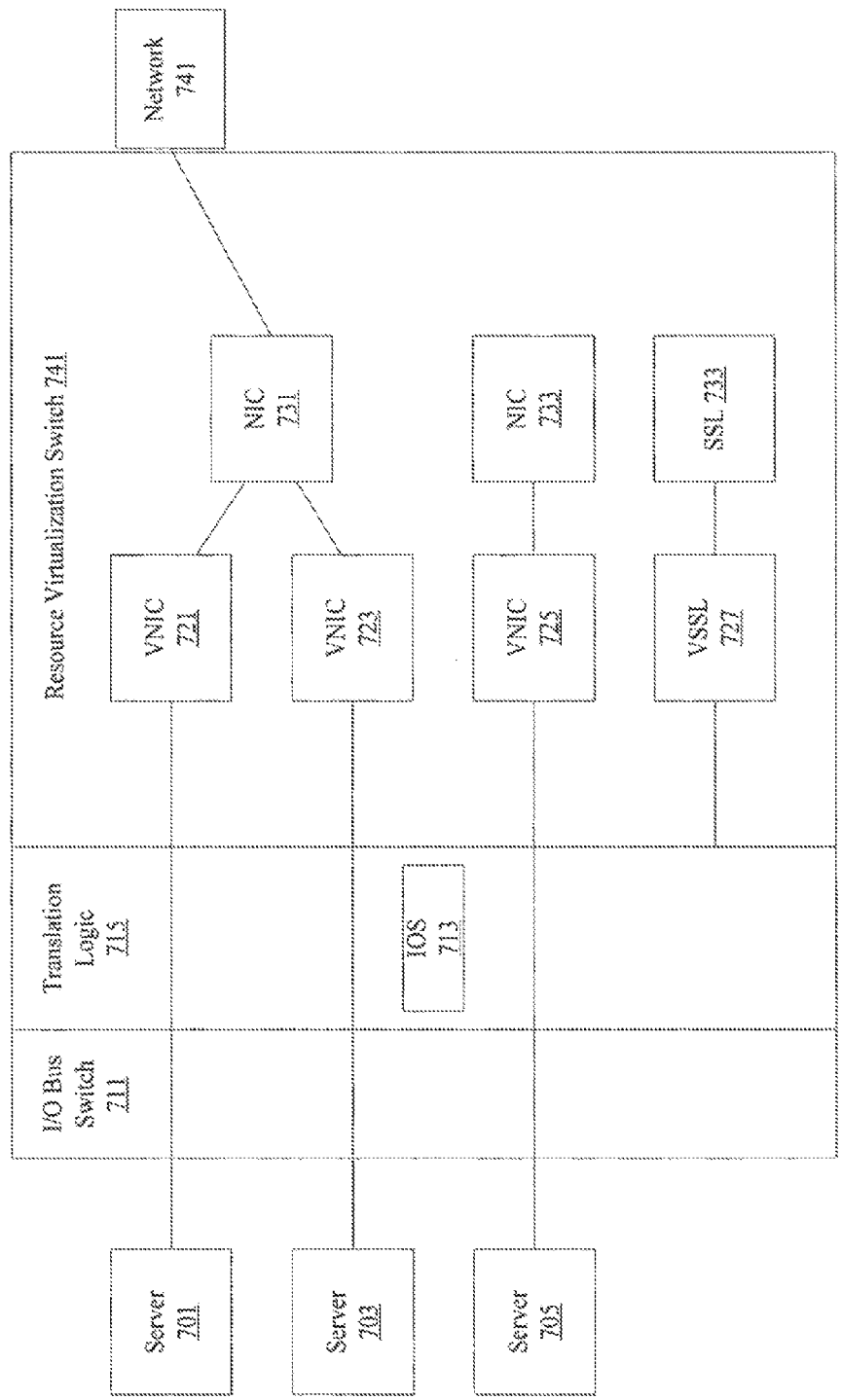
FIG. 7 is a diagrammatic representation showing a resource virtualization switch platform.

FIG. 7 is a diagrammatic representation showing multiple servers mapped to shared resource virtualization switch resources. According to various embodiments, servers 701, 703, and 705 are connected to VNICs 721, 723, and 725 and VSSL 727. In some embodiments, each VNIC and VSSL is associated with a buffer ring or descriptor ring that servers access in order to write data to the resource virtualization switch. Although a VNIC and a VSSL is used as an example, a variety of other resources can also be virtualized. For example, a VHBA can also be used. For example, the buffer/descriptor ring may include read queues, write queues, and control queues which may not necessarily hold the data itself, but may be used to hold descriptors identifying or referencing the data in memory. Descriptors are used in a number of conventional I/O controller applications. A large number of queues may be provided. In some instances, application specific queues are provided to allow quality of service on an application level. VNICS having packet inspection or deep packet inspection capabilities can snoop packets at a resource virtualization switch and determine which queues to use. Different queues can have different associated quality of service levels.

Consequently, when a server is writing to a VNIC or VSSL, the server will write descriptors into the buffer/descriptor ring of corresponding VNIC or VSSL. In one example, virtual NICs 721 and 723 are coupled to NIC 731. VNICs 721 and 723 each have buffer/descriptor rings accessible by servers bound to those particular VNICs. Similarly, servers may be bound to VNIC 725 and VSSL 727. VNICs and VSSLs are also referred to herein as a virtualization (V) chip, virtualization logic, or virtualization circuitry. According to various embodiments, server to virtualization logic communication traffic is switched by a PCI Express fabric. Each server has a memory window programmed to communicate with other servers and virtualization logic. According to various embodiments, virtualization logic is associated with a combined address map corresponding to all servers. Virtualization logic pulls data from server memory. In some embodiments, the base address and number of descriptor entries are programmed in virtualization logic. For example, a particular VNIC 721 may have base address and descriptor information associated with a particular server. Virtualization logic polls the descriptor ring to find whether any packet is ready to be transmitted. Using bus arbitration mechanisms, virtualization logic can read data associated with the descriptor and forward the information to NIC 731.

Similarly for receive traffic, virtualization logic prefetches descriptors and keeps the buffers, so when virtualization logic receives packets for a particular server, it writes the pre-fetched buffer address and at the end of the write, it assigns the ownership bit to the server processor. The server processor can then read the buffer address and obtain the receive data. In one example, a VNIC chip has 4 ports connected to four separate servers over a PCI Express bus. Each VNIC chip can be coupled to separate conventionally available NICs or can have NIC functionality integrated within each chip.

When a data sequence is received from a server 701, information identifying the server associated with the data sequence is mapped with server 701 and maintained in a database. According to various embodiments, the servers and VNICs and VSSLs communicate using bus arbitration mechanisms available on a PCI Express bus. NICs 731 and 733 communicate with external network entities in the same manner conventional NICs communicate.

VNICs 721, 723, and 725 and VSSL 727 are coupled to servers 701, 703, and 705 through art I/O bus switch 711 and translation logic 715. According to various embodiments, translation logic is used to split PCI Express (10 Gbps) in two 5 Gbps I/O slots each with a SPI-3 interface to support 4 Gbps throughput. The translation logic terminates a PCI Express protocol from the I/O bus and tunnels PCI Express read/write requests over SPI-3 to and from VNICs and VSSLs. Interrupt messages generated are routed from I/O adaptors to translation logic 715 and sent to appropriate servers. Translation logic 715 also provides path to I/O switch chip that switches traffic between different IO adaptors.

The translation logic 715 provides switching capability between multiple I/O adaptors by tunneling SPI-3 packets through PCI Express. The translation logic 715 can also be used to implement in I/O switch or implement a DMA engine. An I/O switch (IOS) 713 can also be provided to allow switching between I/O adapters or resources. According to various embodiments, I/O adapters communicate with each other through translation logic 715 and an associated I/O switch 713. The I/O switch provides a pipe between I/O adapters and resources.

Figure 8:
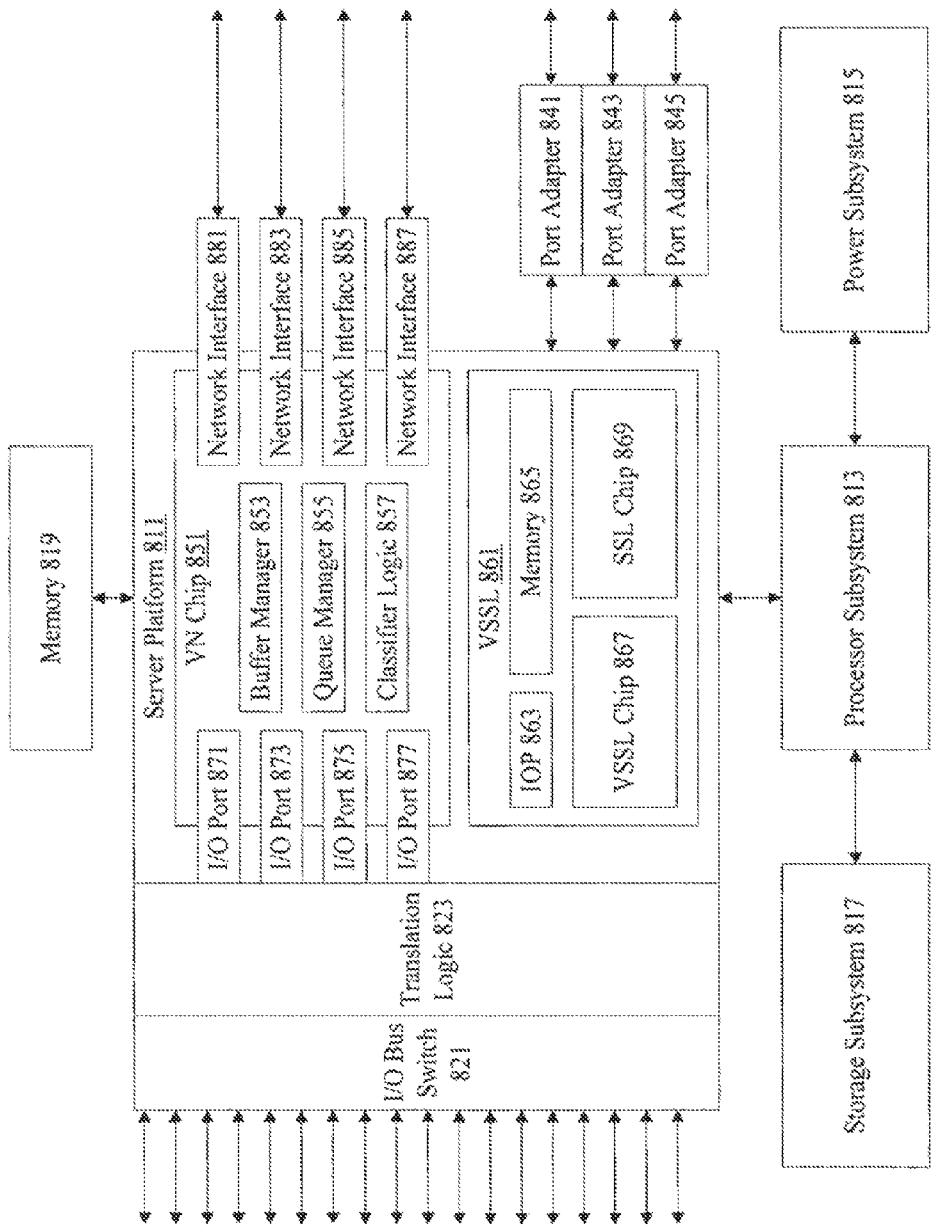
FIG. 8 is a diagrammatic representation showing a resource virtualization switch platform with VNIC and VSSL resources.

FIG. 8 is a diagrammatic representation showing one example of a resource virtualization switch. An I/O bus switch 821 is connected to multiple computer systems using an I/O bus such as a PCI Express bus and translation logic 823. Port adapters 841-845 are associated with multiple resources such as HBAs, sATAs, hardware accelerators, etc. According to various embodiments, a VNIC chip or VN chip 851 has integrated virtualization logic and port adapters in network interfaces 881-887. A VSSL card 861 also has integrated virtualization logic included in VSSL chip 867 as well as an SSL accelerator 869. Although only a VNIC and a VSSL are shown, it should be recognized that a variety of other virtualization mechanisms such as VHBAs and VXMLs can be included. The network interfaces 881-887 may be MAC interfaces associated with multiple gigabyte ports. According to various embodiments, network interfaces 881-887 include logic mechanisms conventionally found in a NIC. The server platform 811 manages interaction between the servers connected to the I/O bus switch 821 and various resources associated with the port adapters 841-845 and network interfaces 881-887.

The server platform 811 is associated with memory 819 and a processor subsystem 813, a power subsystem 815, and a storage subsystem 817. In some embodiments, the server platform 811 includes tables with information mapping various servers connected through the I/O bus switch 821 and various port adapter resources and network interfaces. The processor subsystem 813 is configured to manage port adapter resource as though the port adapters and network interfaces 881-887 were included in individual servers. In one example, the processor subsystem 813 is configured to initialize an IP network connection regardless of whether servers have been connected to the server platform 811.

According to various embodiments, the I/O bus switch 821 supports flexible virtual channel configuration, high availability, and dynamic port configurations. Examples of I/O bus switches include the PCI Express switch PEX 8532 available from PLX Technology, Inc. of Sunnyvale, Calif. and the PCI Express switch PES-48G available from IMC Semiconductor of Agoura Hills, Calif.

A VSSL card 861 is coupled to translation logic 823 and the I/O bus switch 821. According to various embodiments a VSSL card 861 is separate from a VNIC or VN chip or card 851. The VSSL card includes a VSSL chip 867. In some embodiments, the VSSL chip 867 polls transmit and receive queues associated with various servers. When it sees a packet in a server transmit queue, it pulls the packet and forwards associated commands to an SSL chip 869. SSL chip 869 can be one of a number of available SSL accelerators, such as the Nitrox Chip available from Cavium Networks of Mountain View, Calif. It should be noted that although a VSSL card 861 and a VN chip 851 are shown, virtualization logic and accelerator functionality can also be implemented in a single chip. Alternatively, a VN chip 851 may be separated out into multiple components and implemented as a card. In still other implementations, all virtualization logic for the VN chip 851, the VSSL card 861, and any other components is implemented in a single device. In one embodiment, an SSL chip 869 includes general purpose processor cores and specialized cryptography cores included on a single ASIC. The cryptography cores may include SSL cores, IP Security (IPSec) cores, SSL-VPN cores, XML/web services cryptography cores, storage and fibre channel data cryptography cores, and email data cryptography cores.

IOP 863 is configured to perform context management for SSL chip 869. According to various embodiments, an SSL agent runs on IOP 863. The SSL agent manages and allocates key memory and context memory. A context is used for each SSL connection. A context is allocated before a new SSL connection is established. According to various embodiments, context can be established in several manners.

A server can send a context allocation request to the SSL transmit queue. The VSSL chip 867 pulls this request and notifies the SSL agent running on IOP 863. The SSL agent allocates a new context and passes an index back to the VSSL chip 867. The VSSL chip 867 sends the response back to the server's receive queue. An application will now have a context allocated for it and the context can be passed in for all SSL requests.

Alternatively, an SSL agent could allocate a pool of contexts per server. Whenever an application needs a new context, it could get the context locally from the VSSL driver (which keeps a cache of the contexts). Once the VSSL driver's cache runs out of contexts, it sends a request to the SSL Agent to obtain additional contexts.

According to various embodiments, a VNIC chip or VN chip 851 is also coupled to the I/O Bus switch 821 through optional translation logic 823. The VN chip 851 has I/O ports 871-877 such as PCI Express interfaces coupled to the I/O bus switch 821. The VN chip 851 also has a connection with the processor subsystem 813 and a series of network interfaces 881-887 connecting the VN chip 851 to external network entities. In other examples, the VN chip may not include NIC interfaces and instead may be connected to conventional NICs.

The VNIC chip includes classifier logic 847, a queue manager 845, and a buffer manager 843. According to various embodiments, the classifier logic 847 includes parse and lookup logic configured to identify information such as a packet destination server and priority. Classifier logic can also be used to filter incoming data or apply traffic policing policies. In some instances, classifier logic can be used to block packets in order to implement a firewall. In one embodiment, classifier logic 847 parses a packet and uses the information in the packet to identify entries in lookup tables. The data is then buffered. Buffer manager 843 manages data in memory associated with the VN chip 851. Queue manager 845 manages descriptors for data posted. A descriptor can include a reference to a memory location, a length, a source port, and a multicast count, as well as other parameters.

In one example, classifier logic 847 determines that the packet received is a high priority packet and should be placed in a high priority queue by the buffer manager 843. Parameters provided may include a pointer, a length, a source port, a multicast count, and a queue identifier. The data is then placed into memory and information referencing the data such as a pointer and a length is posted into a buffer ring or a descriptor ring. When a connected server successfully arbitrates for bus access, the server reads the buffer ring or descriptor ring and obtains the data from memory associated with the VN chip. According to various embodiments, the server reads the data directly into its own memory.

Each individual server may also include descriptor queues. As will be appreciated, the servers connected to the I/O Bus Switch and the resource virtualization switch arbitrate for access to the I/O Bus. When access is obtained, data can be read from memory associated with one of the server based on the information provided in the descriptor queues.

Redundancy mechanisms are also provided to allow continued operation in the event that a NIC or other resource fails or a resource virtualization switch itself fails. Redundancy mechanisms can be managed by a VNIC device or VN chip, a resource virtualization switch, or by the individual servers themselves.

Figure 9:
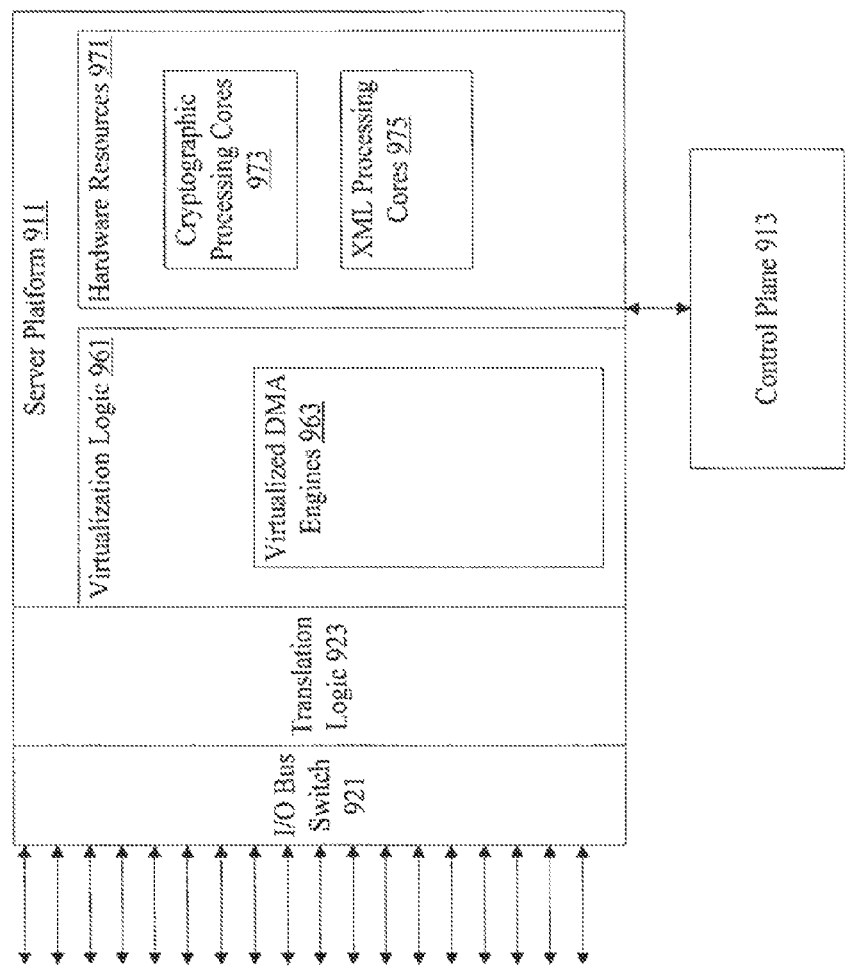
FIG. 9 is a diagrammatic representation showing a resource virtualization switch platform with virtualized DMA engines.

FIG. 9 is a diagrammatic representation depicting an embodiment of a resource virtualization switch using virtual Direct Memory Access (DMA) engines. According to various embodiments, a virtual DMA engine and a particular resource is assigned to each application, guest operating system, system image, virtual server, or physical server to provide true hardware acceleration on demand.

An I/O bus switch 921 is connected to multiple computer systems using an I/O bus such as a PCI Express bus and translation logic 923. Virtualization logic 961 obtains data such as descriptor data from individual servers and provides the data to hardware resources 971. In some examples, data transfer is performed using virtualized Direct Memory Access (DMA) mechanisms to allow minimal processor involvement during data transfers. In some embodiments, a descriptor is provided on a descriptor queue. The descriptor includes addresses, lengths, and other data parameters. A virtualized DMA engine 963 virtualization logic 961 reads the descriptor and arbitrates for I/O bus access as needed, and directly transfers the block of data in memory to an appropriate hardware resource 971. In one embodiment, the hardware resources 971 include XML cores 975 and cryptographic cores 973. Cryptographic cores can include cores specifically configured for processing Secure Socket Layer SSL, IP Security (IPSec), storage and fibre channel data, and email data.

Figure 10:
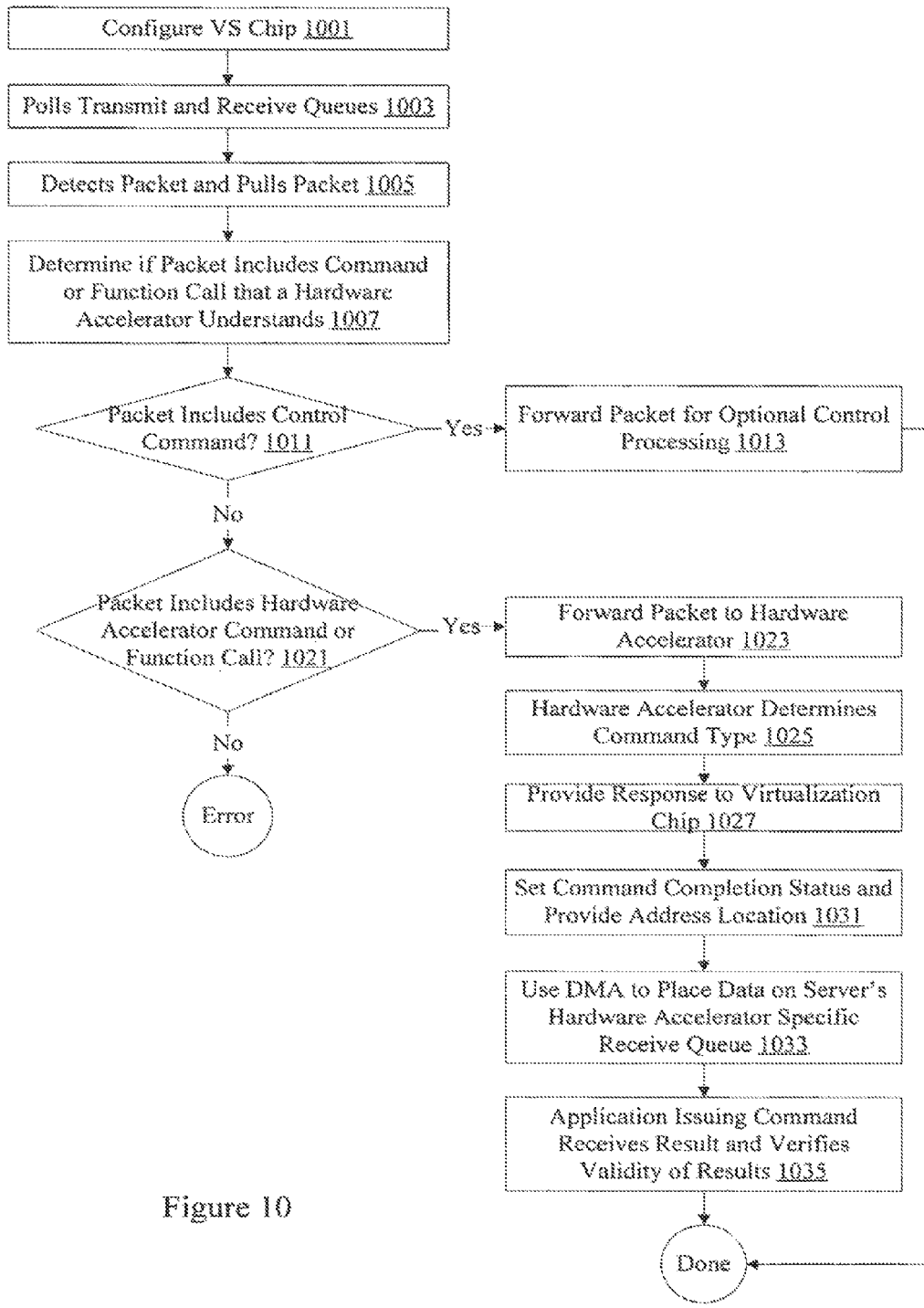
FIG. 10 is a flow process diagram depicting data path processing.

FIG. 10 is a flow process diagram depicting hardware accelerator processing. At 1001, a hardware accelerator such as an XML accelerator or a cryptography accelerator is configured to poll transmit and receive queues associated with particular servers. At 1003, polls transmit and receive queues. At 1005, detects a packet on a transmit queue and pulls the packet. According to various embodiments, virtualization circuitry determines at 1007 if the packet includes a command or function call that the hardware accelerator understands. If the packet includes a control command at 1011, the packet is forwarded at 1013 for optional control processing. Otherwise, it is determined if the packet includes a hardware accelerator command at 1021. If the packet includes an hardware accelerator command or function call, the packet is forwarded to the hardware accelerator at 1023.

The hardware accelerator determines the command type at 1025. According to various embodiments, the command type may be encryption or XML processing related. When the command or function processing is complete, a response is provided to the virtualization chip or virtualization circuitry at 1027. The hardware accelerator also sets the command completion status and provides an address location at 1031. The virtualization chip detects that the command is complete, and takes the results and uses either DMA to transfer the data to the server or places the data on a selected server receive queue at 1033. The application issuing the command gets the result and verifies that the results look valid at 1035.

Redundancy mechanisms are also provided to allow continued operation in the event that a resource or a resource virtualization switch itself fails. Redundancy mechanisms can be managed by virtualization logic. An example showing redundancy for a network interface card will now be shown. However, it should be noted that the redundancy mechanisms can be applicable to a variety of peripheral components and peripheral interfaces. In one example, redundancy is managed by virtualization logic included associated with a VNIC device or VN chip, a resource virtualization switch, or by the individual servers themselves.

Figure 11:
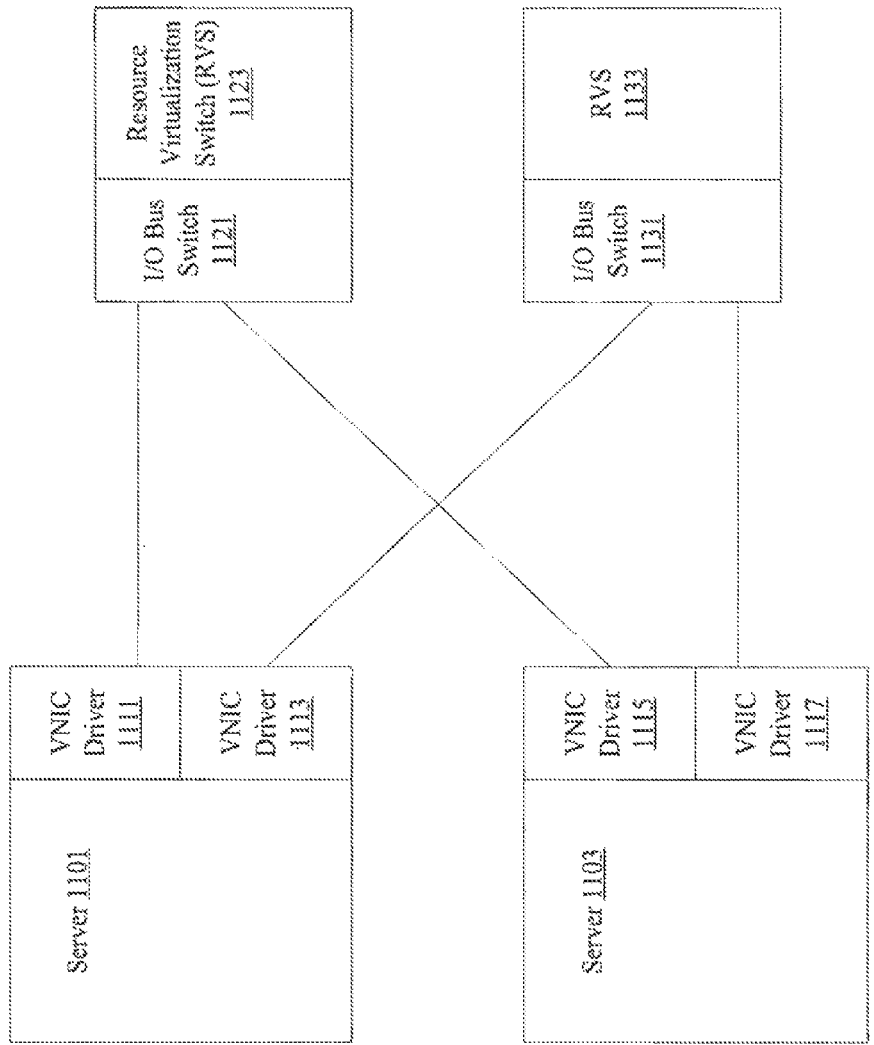
FIG. 11 is a diagrammatic representation showing one technique for providing redundancy that involves management by individual servers.

FIG. 11 is a diagrammatic representation showing one technique for providing redundancy that involves management by individual servers. Multipathing is a conventional mechanism that allows the creation of interface groups that allow standby or simultaneous operation of devices. In one example, a server includes multiple device drivers associated with multiple NIC cards. One card may be active and the other standby, or the NIC cards may be used simultaneously to allow load balancing. However, requiring multiple NIC cards in conventional implementations can lead to device underutilization.

The techniques and mechanisms of the present invention contemplate providing multipathing using VNICs. In one embodiment, multiple VNIC device drivers 1111 and 1113 are configured on a server 1101. Multiple VNIC device drivers 1115 and 1117 are configured on server 1103. The server performs protocols such as link aggregation or IP multipathing to achieve redundancy. The VNIC device drivers are associated with different VNICs and NICs and possibly different resource virtualization switches. In one embodiment, a server 1101 includes an active VNIC driver 1111 associated with resource virtualization switch 1123. If the NIC in resource virtualization switch 1123 fails, or the resource virtualization switch 1123 itself fails, the standby VNIC driver 1113 can take over operation. The VNIC driver on the server gets an indicator that a VNIC, NIC, or NIC port is down. Switchover can occur after a period of inactivity, interrupts, or after failure to receive heartbeat indicators. The driver propagates this information to the IP routing layer where all routes that correspond to that device are deleted. If there is a redundant configuration available, such as a redundant driver, the IP routing layer replaces the original outgoing interface with the new redundant interface. The traffic is then forwarded using the standby VNIC driver.

By providing multiple VNIC device drivers with each server, port failure, failure, and resource virtualization switch failure can all be handled without excessive detriment to higher layer applications. However, each VNIC driver may be associated with NICs that have different IP addresses and MAC addresses. However, protocols such as link aggregation and IP multipathing require processing resources from the server. Processing resources may or may not be readily available. Furthermore, because the redundant NIC used has a different IP and MAC address, route updates may take a longer period of time.

Figure 12:
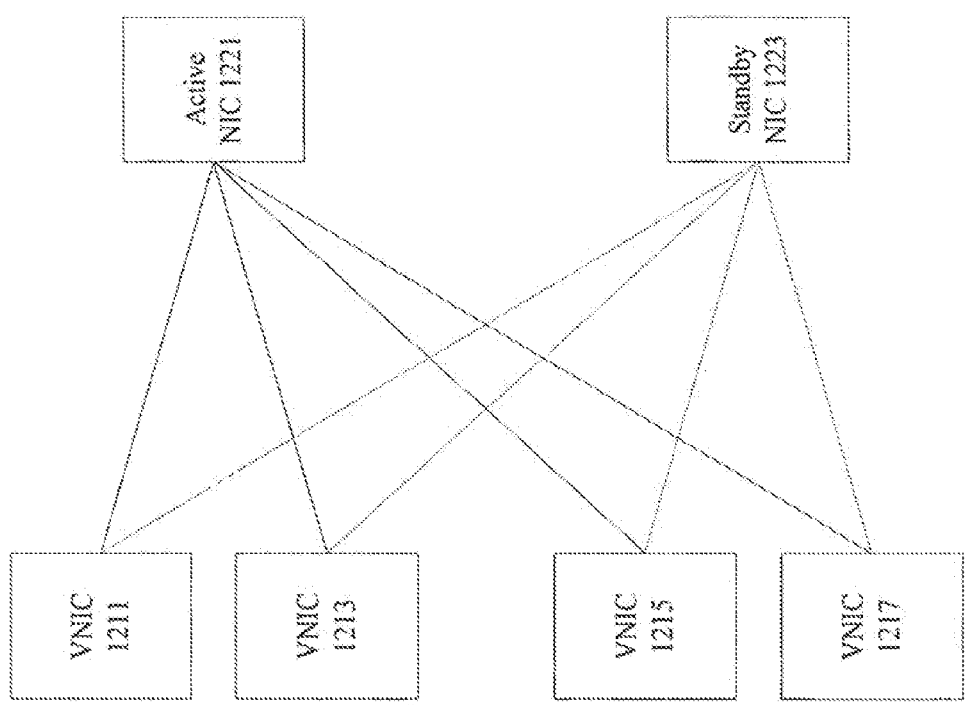
FIG. 12 is a diagrammatic representation showing one mechanism for providing redundancy at a resource virtualization switch.

FIG. 12 is a diagrammatic representation showing one mechanism for providing redundancy at a resource virtualization switch. According to various embodiments, the mechanism does not require any involvement from connected servers. The resource virtualization switch manages the mapping of VNICs to NICs. In one embodiment, VNICs 1211, 1213, 1215, and 1217 are each associated with a server and are all mapped to active NIC 1221. Traffic from the separate servers can be aggregated onto NIC 1221. The control logic on a resource virtualization switch manages the bindings of VNICs to NICs.

According to various embodiments, active NIC 1221 and standby NIC 1223 may have the same configuration including the same MAC address and the same IP address. In other examples, the MAC addresses and the IP addresses may not be the same. Conventional NICs all have globally unique MAC addresses. Manufacturers of NICs request blocks of addresses from a central authority to ensure that no two conventional NICs have the same address to avoid conflicts. However, the VN chip of the present invention allows multiple NICs with the same IP and MAC addresses. Conflicts are avoided because one of the NICs with the same MAC and IP addresses is held inactive.

The control logic associated with the resource virtualization switch monitors the active NIC 1221. In one embodiment, failover is initiated if heartbeat signals are not received from an active NIC after a predetermined period of time. Classifier logic tables can be updated to reflect the new binding of VNICs 1211, 1213, 1215, and 1217 to standby NIC 1223. I some cases, the IP and MAC addresses of the active NIC 1221 and the standby NIC 1223 are exactly the same, and the standby NIC 1223 can assume operation of the active NIC seamlessly. In some embodiments, the MAC addresses of the NICs are different.

Protocols such as the address resolution protocol (ARP) can be used to facilitate failover and allow external network entities to learn IP MAC address associations. ARP maps IP network addresses to the hardware addresses. An external network entity broadcasts a packet that requests the identity of the owner of a particular IP address, such as the IP address used by the now failed NIC 1221. The redundant NIC 1223 will check its IP address and respond with its MAC address. The external network entity learns that the IP address is now associated with the NIC with the new MAC address. Communications over the IP network now use the new MAC address of standby NIC 1223. A number of variations to ARP can also be used.

Figure 13:
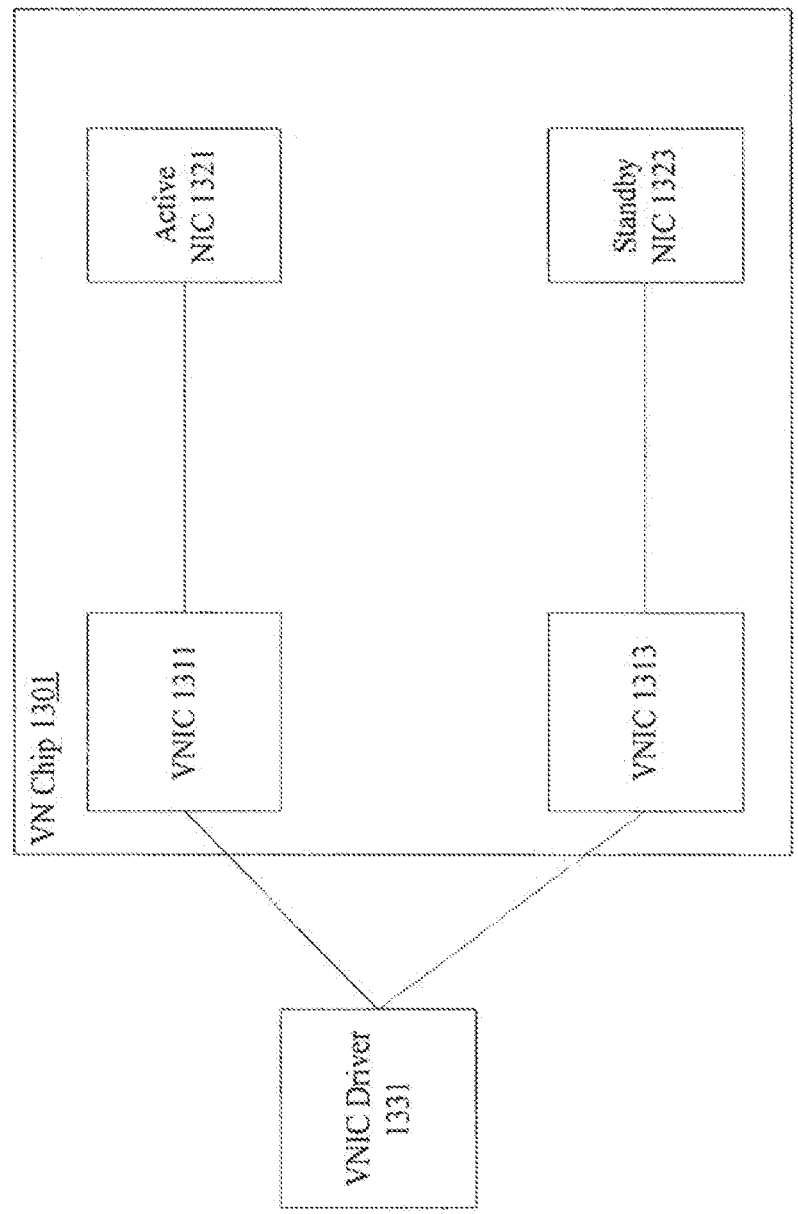
FIG. 13 is a diagrammatic representation showing a server using a VNIC driver that is mapped to multiple VNICs, where each VNIC is bound to a single NIC.

FIG. 13 is a diagrammatic representation showing a server using a VNIC driver that is mapped to multiple VNICs, where each VNIC is bound to a single NIC. Active NIC 1321 and redundant NIC 1323 are bound to VNIC 1311 and VNIC 1313. The server VNIC driver 1331 instantiates a VNIC 1313 for redundant NIC 1323. According to various embodiments, the active NIC 1321 and the redundant NIC 1323 have the same IP address and MAC address configuration but they may terminate on a different port on the resource virtualization switch. When a NIC port fails, the server begins writing into a new buffer ring or descriptor ring so that traffic can be sent out on a new NIC port. Minimum server processor involvement is required and switchover onto the new NIC port is automatic, without the server needing to know about the interface going down. ARP again may be used to speed up learning in neighboring switches.

As noted above, a server is bound to a particular VNIC and uses a buffer/descriptor ring associated with the VNIC to transmit data to a resource virtualization switch. To provide a redundant VNIC to a server, a redundant set of buffer/descriptor queues are provided but left unused. The NIC bound to the redundant VNIC is similarly left unused by the server, although the NIC may be used by a separate server. When failure of a NIC is detected, typically through the failure to receive heartbeat messages, failover is initiated. A new set of buffer/descriptor queues are provided and the server begins to write to the new set of buffer/descriptor queues.

Although a limited number of switchover techniques are described above, it should be recognized that a wide number of variations are possible. By offloading resources such as NICs onto one or more resource virtualization switches and by providing one or more virtual NIC drivers on each server, resources can be dynamically mapped to different servers based on need.

Figure 14:
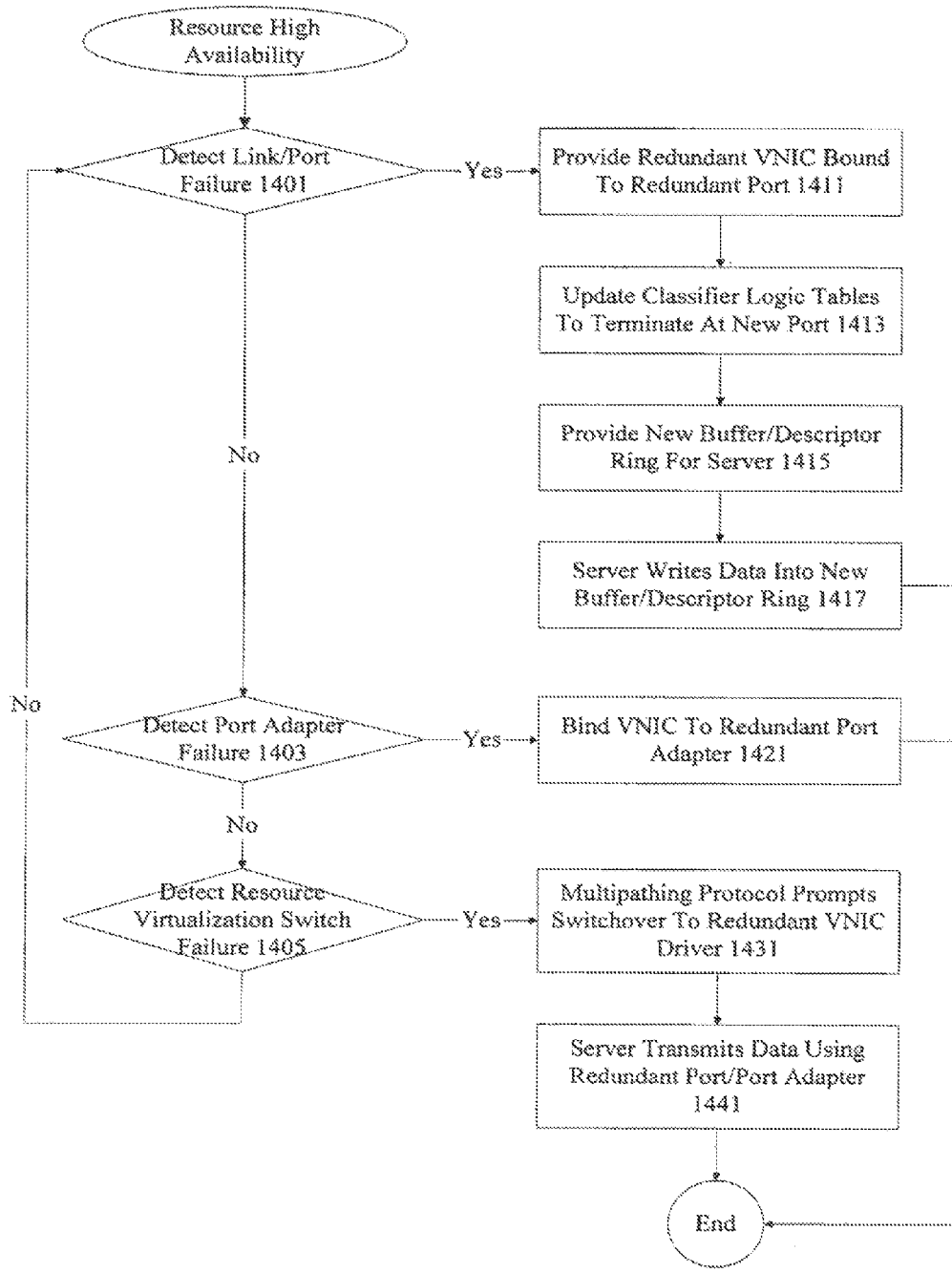
FIG. 14 is a process flow diagram showing one technique for providing high availability.

FIG. 14 is a process flow diagram showing one technique for providing high availability. High availability is provided to handle link failure, port failure, port adapter failure, I/O bus link failure, or resource virtualization switch failure. At 1401, link or port failure is detected. Link or port failure is typically detected by a VN chip associated with a resource virtualization switch. Detecting link or port failure at a VN chip minimizes the involvement of servers connected to the resource virtualization switch. Link or pot failure is typically detected when a heartbeat message is no longer a received. According to various embodiments, if link or port failure is detected, a redundant VNIC already bound to a redundant port 1411 is provided. According to various embodiments, ARP is used to speed up routing table updates at neighboring network nodes.

At 1413, classifier logic tables are updated to terminate at the new port. New buffer/descriptor rings may also be provided for the connected servers at 1415. As noted above, each VNIC is associated with buffer/descriptor rings that allow I/O bus connected servers to communicate with the resource virtualization switch and external network entities. At 1417, the server begins to write data into the new buffer/descriptor rings. The buffer/descriptor rings also allow the resource virtualization switch to provide data to each connected server over the I/O bus.

Port adapter failure may also be detected at 1403. When a port adapter itself fails, this may be detected by a VN chip associated with a resource virtualization switch or may be detected by the control plane of the resource virtualization switch itself. In some examples, a redundant VNIC bound to a new port adapter can be provided in the same manner as described in 1411 to 1417. However, the VNIC can be also be bound to a redundant port adapter. That is, the same buffer/descriptor ring associated with the currently active VNIC can continue to be used while the new VNIC is dynamically bound to a new port adapter. The new port adapter may have the exact same configuration as the old port adapter. The server can continue writing to the same buffer descriptor ring without knowledge of any port or port adapter failure.

The resource virtualization switch itself may also fail at 1405. If the resource virtualization switch itself fails, a protocol such as a conventional multipathing protocol prompts switchover to a redundant VNIC driver 1431. According to various embodiments, redundant VNIC drivers are coupled to redundant VNICs on separate resource virtualization switches. The redundant resource virtualization switch now handles traffic originally handled by the failed resource virtualization switch. Although packet drops and server involvement is minimized, in some instances, packets may have to be retransmitted using TCP/IP retransmission capabilities.

Figure 15:
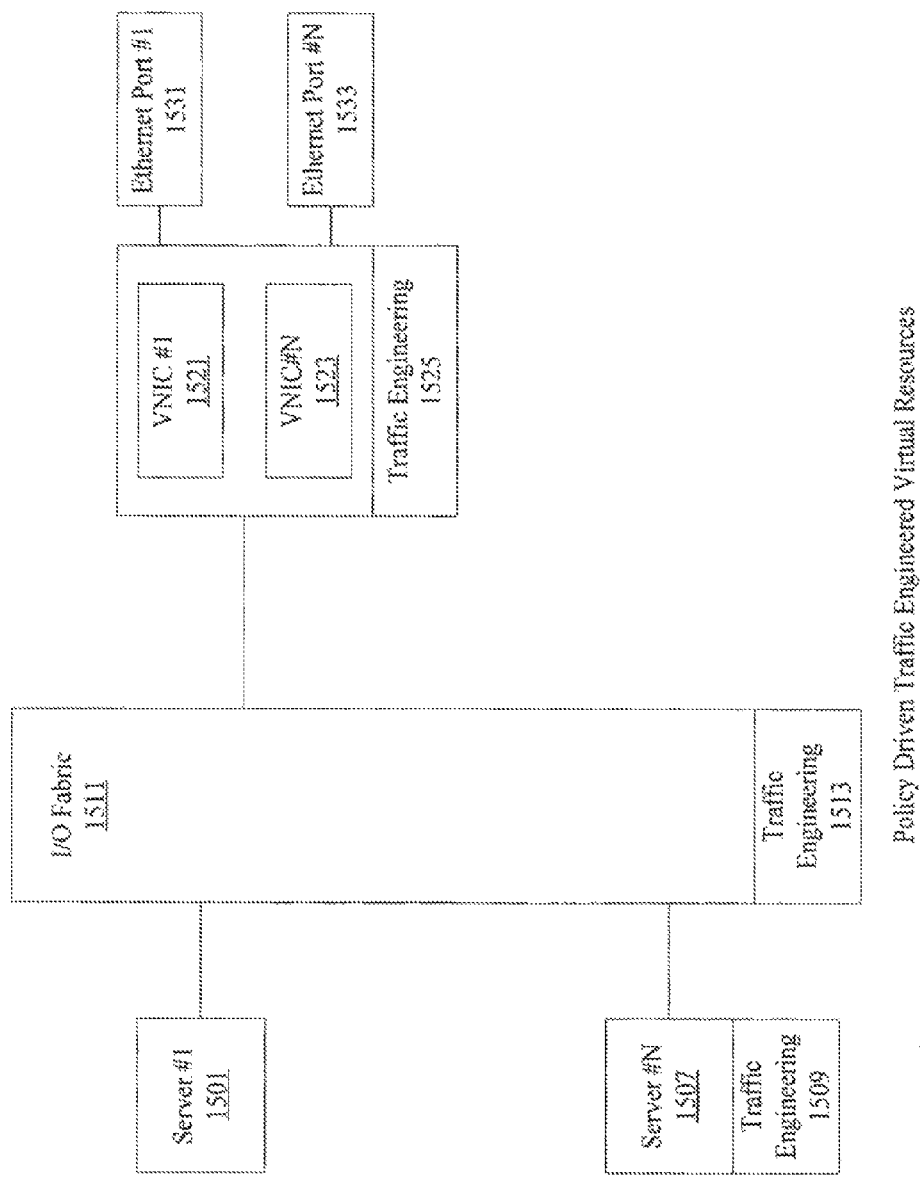
FIG. 15 is a diagrammatic representation showing policy driven traffic engineering.

Resource virtualization switches can also support additional features. FIG. 15 is a diagrammatic representation showing policy driven traffic engineering. Traffic engineering can be implemented at VNICs, on a switch fabric such as a PCI Express fabric, and at individual servers on an application aware basis. In conventional implementations, traffic engineering is implemented at various network switches. In sonic applications, applications themselves can perform some measure of traffic engineering. However, traffic can still be queued or delayed at buses or I/O fabrics because traffic is not conventionally distinguished during transmission on I/O fabrics. In many implementations, traffic flows are distinguished using 5 tuples (transport protocol, source IP address, source port, destination port, and destination address). However, even if traffic flows are distinguished at the network level, traffic is no longer distinguished at I/O buses and congestion for a particular flow can occur.

Consequently, the techniques and mechanisms of the present invention provide traffic engineering outside of the network switch environment. In one embodiment, traffic engineering functionality 1509 is provided at servers 1501 and 1507. Traffic engineering 1513 is also integrated into an I/O fabric 1511. Traffic engineering 1525 is also implemented at VNICs 1521 and 1523. VNICs 1521 and 1523 are connected to Ethernet ports 1531 and 1533 that allow connection to network switches. Consequently, traffic engineering is permitted all the way down to the user application level. Flows can be assigned priorities and policies to allow endpoint to endpoint traffic engineering. Flow counters are used to support charge back based upon user, application and departments. Traffic redirection, passive monitoring, intrusion detection and prevention are all supported. Mapping application flows and providing QoS from the network connection to an application in a server allows support of application service level agreements. It should be noted that an individual server can also be a guest operating system or a virtual machine. Virtual resources connecting servers to an external network can also be provisioned based on policy considerations. PCI Express resources such as bus bandwidth and latency can also be provisioned based on policy considerations.

In addition, although exemplary techniques and devices are described, the above-described embodiments may be implemented in a variety of manners, media, and mechanisms. For instance, instructions and data for implementing the above-described invention may be stored on a disk drive, a hard drive, a floppy disk, a server computer, or a remotely networked computer. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

The invention claimed is:

1. A device comprising:
 a plurality of network interfaces cards (NICs) associated with a plurality of actual device driver signals;
 an interface operable to receive a plurality of modified device driver signals from a plurality of servers connected to the device; and
 virtualization logic operable to map the modified device driver signals from the plurality of servers to the plurality of actual device driver signals to allow the plurality of servers to drive the plurality of NICs.

2. The device of claim 1, wherein the plurality of servers each include a processor and memory and access the plurality of NICs by using modified device driver signals.

3. The device of claim 1, wherein the device is an input/output (I/O) virtualization switch.

4. The device of claim 1, wherein the plurality of servers are connected to the device over an Infiniband fabric.

5. The device of claim 1, wherein the plurality of servers are connected to the device using PCI-Express.

6. The device of claim 1, wherein the plurality of servers are connected to the device using Ethernet.

7. The device of claim 1, wherein the device further comprises a plurality of host bus adapters (HBAs).

8. The device of claim 1, wherein the plurality of servers include a plurality of virtual machines.

9. The device of claim 1, wherein the plurality of modified device driver signals are a plurality of virtual device driver signals.

10. The device of claim 9, wherein the virtual device driver signals are generated by a virtual network interface card (VNIC) driver.

11. The device of claim 9, wherein each of the plurality of servers uses multiple VNIC drivers.

12. A method comprising:
    receiving a plurality of modified device driver signals from a plurality of servers; and
    mapping the plurality of modified device driver signals from the plurality of servers to a plurality of actual device driver signals, wherein the plurality of modified device driver signals allows the plurality of servers to drive a plurality of network interfaces.

13. The method of claim 12, wherein the plurality of servers each include a processor and memory and access a plurality of NICs at an I/O virtualization switch by using modified device driver signals.

14. The method of claim 13, wherein the plurality of servers are connected to the I/O virtualization switch over an Infiniband fabric.

15. The method of claim 13, wherein the plurality of servers are connected to the I/O virtualization switch using PCI-Express.

16. The method of claim 13, wherein the plurality of servers are connected to the I/O virtualization switch using Ethernet.

17. The method of claim 13, wherein the I/O virtualization switch further comprises a plurality of host bus adapters (HBAs).

18. The method of claim 13, wherein the plurality of servers include a plurality of virtual machines.

19. The method of claim 13, wherein the plurality of modified device driver signals are a plurality of virtual device driver signals.

20. An apparatus comprising:
    means for receiving a plurality of modified device driver signals from a plurality of servers; and
    means for mapping the plurality of modified device driver signals from the plurality of servers to a plurality of actual device driver signals, wherein the plurality of modified device driver signals allows the plurality of servers to drive a plurality of network interfaces cards (NICs).

* * * * *